(12) United States Patent
Purvis

(10) Patent No.: US 11,961,666 B2
(45) Date of Patent: Apr. 16, 2024

(54) PULSED E-FIELD PROPULSION SYSTEM

(71) Applicant: James W. Purvis, Albuquerque, NM (US)

(72) Inventor: James W. Purvis, Albuquerque, NM (US)

( * ) Notice: Subject to any disclaimer, the term of this patent is extended or adjusted under 35 U.S.C. 154(b) by 639 days.

(21) Appl. No.: 16/986,257

(22) Filed: Aug. 6, 2020

(65) Prior Publication Data
US 2021/0159005 A1  May 27, 2021

(51) Int. Cl.
| | |
|---|---|
| *H01F 7/20* | (2006.01) |
| *B64G 1/40* | (2006.01) |
| *B64G 1/42* | (2006.01) |
| *C22C 19/05* | (2006.01) |
| *H01G 11/32* | (2013.01) |
| *H02N 11/00* | (2006.01) |
| *F03H 99/00* | (2009.01) |

(52) U.S. Cl.
CPC ............. *H01F 7/202* (2013.01); *B64G 1/409* (2013.01); *B64G 1/422* (2013.01); *B64G 1/423* (2013.01); *B64G 1/425* (2013.01); *C22C 19/058* (2013.01); *H01G 11/32* (2013.01); *H02N 11/006* (2013.01); *F03H 99/00* (2013.01)

(58) Field of Classification Search
CPC ........... F03H 1/0037; F03H 3/00; F03H 99/00
See application file for complete search history.

(56) References Cited

U.S. PATENT DOCUMENTS

| | | | |
|---|---|---|---|
| 3,187,206 A | 6/1965 | Brown | |
| 3,227,901 A | 1/1966 | Bahnson | |
| 5,142,861 A * | 9/1992 | Schlicher | F03H 3/00 60/203.1 |
| 5,280,864 A | 1/1994 | Woodward | |
| 5,337,209 A | 8/1994 | Sutherland et al. | |
| 6,492,784 B1 | 12/2002 | Serrano | |
| 6,775,123 B1 | 8/2004 | Campbell | |
| 8,675,336 B2 | 3/2014 | Lavene et al. | |
| 9,287,840 B1 | 3/2016 | Woodward | |
| 9,530,574 B1 | 12/2016 | Phillips | |
| 9,617,407 B2 | 4/2017 | Nakahiro et al. | |
| 9,991,052 B2 | 6/2018 | Nakatsuka et al. | |

(Continued)

FOREIGN PATENT DOCUMENTS

GB    2399601    9/2004

OTHER PUBLICATIONS

Tipler Physics for Scientists and Engineers Fifth Edition (Year: 2004).*

(Continued)

*Primary Examiner* — Arun Goyal
*Assistant Examiner* — William L Breazeal

(57) ABSTRACT

The present invention discloses an electric field propulsion system for spacecraft. The system includes a capacitor stack comprising an array of supercapacitors. Solid-state electronic circuits generate modulated currents and electric fields in pulse coils. The pulse coils direct the electric fields onto separated electric charges stored in the capacitor stack. The resulting unidirectional Lorentz Forces thereby generate thrust without reaction mass. Reaction momentum is carried away by Poynting Vector fields in conformity with the currently understood principles of electrodynamics. The design is scalable down to micro-chip sized thrusters.

19 Claims, 12 Drawing Sheets

(56) References Cited

U.S. PATENT DOCUMENTS

| | | | |
|---|---|---|---|
| 10,006,446 B2 | 6/2018 | Purvis | |
| 10,135,323 B2 | 11/2018 | Purvis | |
| 2014/0013724 A1 | 1/2014 | Fetta | |
| 2016/0254737 A1* | 9/2016 | Purvis | H02K 41/0358 310/112 |
| 2017/0264181 A1* | 9/2017 | Purvis | F41B 6/00 |

OTHER PUBLICATIONS

N.N Malikarjuna, et al., "Novel high dielectric constant nanocomposites of polyaniline dispersed with γ-Fe2O3 nanoparticles," Applied Polymer Science, V.97, I.5, Sep. 2005.

Lu, Jiongxin-Hsien et al., "High dielectric constant polyaniline/epoxy composites via in situ polymerization for embedded capacitor applications," Polymer, V48, I.6, 2007.

Stafford, Thomas P., "America at the Threshold: Report of the Synthesis Group on America's Space Exploration Initiative", 1991, pp. 64-68,NASA.

NASA, "Breakthrough Propulsion Project, Workshop Proceedings", NASA TM/1998-208400, pp. 4-9, 1998.

White, Harold et.al.,AIAA Journal of Propulsion and Power, vol. 33, No. 4, pp. 830-841.

Stebens, C.T., "Forces on Fields", arXiv:1707.04198 [physics.hist-ph], pp. 1-21, 2017.

Feynman, R.P., et.al., The Feynman Lectures on Physics, vol. II, Ch. 26-2, 1997.

Valone, T., "Electrogravitics II", Integrity Research Institute, 3rd edition, 2008, p. 17.

Yang, S., "Dielectric Properties of CaCu3Ti4O12 and Its Related Materials", Masters Thesis, University of Akron, 2006.

Zhuang, T., et.al., "High Breakdown Field CaCu3Ti4O12 Ceramics: Roles of the Secondary Phase and of Sr Doping", Xi'an University, 2017.

Swartz, S.L., et.al., "Dielectric Properties of Lead-Manganese-Niobate Ceramics", Journal of the American Ceramic Society, vol. 67, Iss. 5, 1984.

DEY,ASHIS, et.al., "Characterization and dielectric properties of polyaniline-TiO2 nanocomposites", Nanotechnology, vol. 15, No. 9, 2004.

\* cited by examiner

PULSED E-FIELD PROPULSION SYSTEM

1.0 FIELD OF THE INVENTION

The present invention is directed to electric field propulsion systems for spacecraft. In particular, the present invention is directed to systems and methods generating unidirectional Lorentz Forces by the action of modulated electric fields acting on electric charge stored on arrays of supercapacitors, thereby producing thrust without expelling mass.

2.0 BACKGROUND OF THE INVENTION

U.S. President Donald Trump officially announced the formation of the U.S. Space Force in 2018. The major issue facing such future space activities is propulsion technology. The combination of engine mass, propellant mass and associated tankage in traditional propulsion systems imposes practical limits to space missions. The Stafford Synthesis Group (Stafford, *America at the Threshold*) concluded in 1990 that future space exploration will require advanced propulsion technologies. Subsequently, NASA conducted the *Breakthrough Propulsion Physics Program* (NASA/TM-1998-208400), one intent of which was to identify new propulsion concepts requiring either minimal or no propellant mass by " . . . discovering fundamentally new ways to create motion, presumably by manipulating inertia, gravity, or by any other interactions between matter, fields, and spacetime."

Field propulsion employs electromagnetic field effects for generating propulsion forces, expels no reaction mass, and therefore effectively has an infinite specific impulse. Prior to modern electrodynamics, it had previously been accepted that magnetic field interactions could not be used to produce a propellantless propulsion system due to the required compliance with Newton's Third Law (NTL). However, physicists have known since at least 1952 of apparent violations of NTL, which has led to over thirty US patents and at least two dozen foreign patents being issued for propellantless propulsion devices. Most importantly, recent experimental investigations conducted by NASA with an EM drive device (White, *AIAA Journal of Propulsion and Power*) have definitively confirmed that EM field propulsion is a reality.

Previous works have shown that an electromagnetic (EM) wave can transport energy from point to point. Stebens (Stebens, *Forces on Fields*) proves mathematically that in electromagnetism the force on matter from an electromagnetic field is balanced by an equal and opposite force from matter on the field. Nobel Laureate Richard Feynman (*The Feynman Lectures on Physics*), among others, noted that there are situations in electrodynamics which apparently do not satisfy NTL in classical Newtonian dynamics; but when the changing momentum of the electromagnetic fields is included, then overall momentum is conserved.

By way of example, Jefimenko's causal electric field solution to Maxwell's Equations contains a term defining the impulsive electric field generated by a high time-rate-of-change current (Valone, *Electrogravitics II*). Isolated electric charges reacting to such an impulsive electric field, when said charges are bound structurally to the source of the field as part of a complete closed system, can result in a net unidirectional Lorentz Force on the system. Recent advances in both high-voltage/high current silicon electronics and supercapacitors suggest the feasibility of usefully exploiting this concept. The present invention is an engineering design resulting from a multi-disciplinary application of electrical engineering, materials science, and modem electrodynamics to produce modulated electric fields such as this "impulsive e-field" and direct said fields by means of a special geometry onto separated charge quantities in supercapacitors. The resulting Lorentz Forces on the conductor-supercapacitor system appear to violate Newton's "equal and opposite reaction" Third Law, but in fact momentum transport and momentum exchange—i.e., momentum conservation—between fields and charges enables an electromagnetic field spacecraft propulsion system. A field propulsion system such as this, which does not require expendable propellant and thus has an effectively infinite specific impulse, is an advanced propulsion technology which will significantly impact the future of space exploration.

Modem silicon electronics technology has advanced to the point where thumb-nail-sized logic chips and MOSFET transistors now make it possible to switch large currents and voltages within of tens of nanoseconds. The classic CMOS 555 timer is routinely used for microsecond pulse-width-control timing of N-channel power MOSFETs such as the IXYH100N65C3, designed for switching 200 A at 650V, and the SCT3030KLGC11 which switches 72 A at 2 kV. The newest Silicon Carbide MOSFETs report voltage capability up to 10 kV. This technology now makes possible the generation and control of large values of electric field impulses on the order of $10^7$ $coul/sec^2$ or higher. The remaining challenge for the present invention is to isolate a significant quantity of charge, e.g. on the order of one coulomb. This will necessitate the use of high energy density capacitors and techniques to charge them. There are three candidate technologies: electrolytic ceramic high dielectric material (HDM) capacitors, wound metalized film capacitors, and electrostatic-double-layer supercapacitors, each of which has characteristics desirable for the present invention.

Supercapacitors were discovered in 1970, and have evolved into three types: electrostatic-double-layer capacitors (EDLCs), pseudocapacitors, and asymmetric electrode hybrid supercapacitors. Basic supercapacitor components are current collectors, porous carbon electrodes, and an ionized electrolyte. In contrast to ceramic dielectric capacitors, EDL supercapacitors consist of two electrodes separated by an ion-permeable membrane and electrically connected via the electrolyte. Energy storage occurs within very thin Helmholtz double-layers at both electrodes; however, these double-layers have no conventional solid dielectric to separate the charges. Generally, the energy storage of supercapacitors is 10 to 100 times greater than that of electrolytic HDM capacitors. Pseudocapacitors store electrical energy by means of reversible faradaic redox reactions on the surface of suitable electrodes in a capacitor with an electrostatic double-layer. An electron charge-transfer between electrolyte ions and electrodes occurs, whereby the ions have no chemical reaction with the atoms of the electrodes since only a charge-transfer take place. Asymmetric electrode hybrid supercapacitors, such as the lithium-ion supercapacitor, are a combination of the EDLC and the pseudocapacitor.

3.0 RELATED ART: FIELD PROPULSION AND SUPERCAPACITORS

Through an electrokinetic phenomenon termed the Biefeld-Brown Effect, electrical energy input into asymmetrical capacitors can be converted to mechanical energy which then provides a force for propelling an object. U.S. Pat. No. 3,187,206 issued to T. T. Brown, a co-discoverer of the Biefeld-Brown Effect, U.S. Pat. No. 3,227,901 to A. H.

Bahnson, and U.S. Pat. No. 6,775,123 to Campbell (assigned to NASA) are examples of devices based on utilization of the effect. Asymmetrical capacitor devices based on the Biefeld-Brown Effect have consistently reported 50 milli-newtons of thrust from 35 to 45.5 watts of input power. Another such electrokinetic device disclosed in U.S. Pat. No. 6,492,784 to Serrano proposes to generate the Biefeld-Brown Effect by using stacked-disc asymmetrical dielectric capacitors; however, neither theoretical nor experimental performance data is presented.

One current example of a propellantless field propulsion system is disclosed in British Patent GB2399601 to Shawyer, as well as U.S. Pat. Appl. No. 20140013724 to Fetta, wherein an axially-asymmetric resonant electromagnetic (EM) wave cavity generates a net unidirectional force without reaction mass. Experimental versions of these EM devices have reported test thrust levels of 8-10 milli-newtons from 10.5 watts of power for the Fetta-Cannae drive. NASA's Eagleworks tested several versions, with 0.091 millinewtons from 17 watts, 0.050 millinewtons from 50 watts, and in a published journal article, 0.048-0.096 millinewtons from 40-80 watts of input power (*AIAA Journal of Propulsion and Power*, op. cit.).

U.S. Pat. No. 5,280,864 to Woodward in 1994 discloses a method for producing transient fluctuations in the inertial masses of material objects. Subsequently, Woodward disclosed various improvements for producing propellantless thrust by using piezoelectric force transducers attached to resonant mechanical structures, in accordance with Mach's principle and local Lorentz-invariance predictions of transient rest mass fluctuations in accelerated objects. The device was designated the "Mach Effect Thruster". The latest U.S. Pat. No. 9,287,840 to Woodward in 2016 disclosed an improved device which produced 6-7 micronewtons of thrust with a 100 W power input. The disclosure states that the device is not scalable and that arrays of multiple small devices will be necessary to generate larger thrusts.

U.S. Pat. No. 10,135,323 to Purvis discloses a segmented-current capacitive-discharge device for spacecraft electromagnetic field propulsion. The system includes capacitor assemblies bracketed by electromagnetic solenoids configured in Helmholtz Coil geometries. The action of magnetic fields generated in the solenoids on segmented currents in conductive discharge elements during capacitor discharge produces unidirectional forces, creating thrust without reaction mass. Another concept using capacitors is disclosed in U.S. Pat. No. 10,006,446 to Purvis. This device includes a multi-element capacitor with segmented plates on the cathode, a means for charging and discharging the capacitor, a means for rotating the cathode of the capacitor, one or more electromagnetic coils, and a means for periodically shaping the magnetic fields from the coils. This device uses interactions between magnetic fields from the coils and rotating charged elements on the cathode to achieve thrust without expelling mass, and with predicted power requirements several orders of magnitude less than current proposed systems.

Electrolytic high dielectric material (HDM) capacitors consist of two electrodes separated by an HDM with relative permittivity $\varepsilon_r$ on the order of $10^4$ to $10^5$. The two highest value HDM candidates are currently $CaCu_3Ti_4O_{12}$ (CCTO) and Pb—Mg-Niobate (PMN). The dielectric properties of CCTO material were first reported in 2000. CCTO ceramics have been extensively studied due to a dielectric constant of up to $10^5$, which is frequency independent in the range of 102-106 Hz and exhibits excellent temperature stability over 100-600° K. Results from studies in 2006 for CCTO at room temperature exhibited a dielectric constant as high as 18,400 (Yang, *Dielectric Properties of $CaCu_3Ti_4O_2$ and Its Related Materials*). These properties were verified in 2017 (Zhuang et. al., *High Breakdown Field $CaCu_3Ti_4O_{12}$ Ceramics*) where $CaCu_3Ti_4O_{12}$-$0.5CuAl_2O_4$ samples with proper sintering conditions were found to have greatly enhanced breakdown fields of more than 2 kV/mm compared to the ordinary value of 0.1 to 0.2 kV/mm in CCTO ceramics. In addition, reduced dielectric loss tangent of these samples remained about 0.1 at a low frequency of 0.1 Hz, indicating superior dielectric properties.

U.S. Pat. No. 5,337,209 to Sutherland et. al in 1994 disclosed multiple layers of Pb—Mg-niobate separated by electrodes which exhibited between 5 and 6.7 $J/cm^3$ with $\varepsilon_r$ of 1200-1750 and dielectric breakdown at 65 kV/mm. A dielectric ceramic composition is disclosed comprising lead magnesium niobate and strontium titanate, barium titanate or a combination thereof. The lead magnesium niobate with strontium titanate and/or barium titanate composition has been found to possess extremely favorable properties such as high dielectric constant, low dielectric loss, high breakdown strength, low field-induced strain, high electrical resistivity and exceptionally high energy storage capacity. One composition surprisingly demonstrated a higher energy storage capacity, approximately 6.7 $J/cm^3$, and a high breakdown field, greater than 65 KV/mm, while maintaining a high relative permittivity as compared to conventional dielectrics. Swartz subsequently reported in 1999 values of $\varepsilon_r$=18,000 for pure PMN and 31,000 for PMN doped with 10% $PbTiO_3$ (Swartz, et. al, *Dielectric Properties of Lead-Magnesium-Niobate Ceramics*). It is currently believed that these values are near the theoretical limits of ceramics as dielectrics.

U.S. Pat. No. 9,530,374 to J. Phillips and S. Fromille in 2016 (assigned to the U.S. Navy) discloses both the manufacturing process and experimental data for EDLC Super Dielectric Materials (SDMs) supercapacitors, which is a new and enabling technology for the present invention. Two types of EDLC SDMs were constructed and tested experimentally: 2.5 cm discs with alumina/boric acid electrolyte exhibiting $\varepsilon_r$=$10^8$ and 5 cm discs with alumina/NaCl electrolyte exhibiting $\varepsilon_r$=$10^9$. The capacitance of saline SDMs tested at 1 to 4 farads at 0.3-1.1 volts. In addition, the SDMs function at relatively low voltages, rather than the kilovolt levels required by electrolytic HDMs. The SDMs exhibited repeatable charge and discharge cycles at these low voltages, promising the large charge accumulations necessary for the current device to function at exceptional force levels. Commercially available lithium-ion based hybrid supercapacitors, such as the Maxwell Technologies BCAP3400, have capacitances up to 3400 farads and operating voltages up to 4.0 volts, all packaged in a 5.5 inch long, 2.4 inch diameter case.

Polypropylene has long been the dielectric film of choice for wound dry metalized film capacitors. However, with a dielectric constant $\varepsilon_r$ of only about 3, storage of large amounts of charge is not efficient. Polyaniline (PANI) is a conducting polymer of the semi-flexible rod polymer family. Amongst the family of conducting polymers and organic semiconductors, polyaniline has many attractive processing properties. From 2004 to 2013 scientific journals reported extensive research on polyaniline films with results for $\varepsilon_r$ ranging from 800 to $2 \times 10^5$. These values resulted from nano-composites made with pure epoxy, $TiO_2$ nanoparticles, $Fe_2O_3$ nanoparticles, coated carbon nanotubes, and nanoscale PANI embedded in poly-acrylic acid. Of particular interest herein are the PANI-epoxy and PANI-TiO$_2$ nano-composites with $\varepsilon_r$ of 3000 and 3700 respectively, and the y-Fe$_2$O$_3$ nanocomposite with $\varepsilon_r$ of 5500.

In 2004, nanocomposites of polyaniline-titanium dioxide were prepared from a colloidal solution of TiO$_2$ nanoparticles. Attention to the interface between the PANI and TiO$_2$ produced a very large dielectric constant of 3700 at room temperature (Dey et. al, *Nanotechnology*). Then in 2005, novel nanocomposites of polyaniline dispersed with y-Fe$_2$O$_3$ nanoparticles were produced by the in situ polymerization of aniline in the presence of ammonium peroxysulfate as an oxidizing agent. A maximum dielectric constant of ~5500 was achieved when 10 mass % y-Fe$_2$O$_3$ nanoparticles were present (Malikarjuna, et. al, *Applied Polymer Science*). Next in 2007 polyaniline (PANI)/epoxy composites with different PANI contents were developed by in situ polymerization of aniline salt protonated with camphorsulfonic acid within epoxy matrices, with one composition resulting in a high dielectric constant of close to 3000 (Lu et. al, *Polymer*).

More recently, pertinent supercapacitor research concepts have been patented. U.S. Pat. No. 8,675,336 to Lavene et. al. of 2014 discloses multiple concentric metalized film capacitors that are wound one on top of another, using a previous capacitor as a new winding core. U.S. Pat. No. 9,617,407 to Nakahiro et. al. of 2017 discloses a highly insulating film, which is characterized by including a biaxially stretched film containing a styrene polymer having a syndiotactic structure as a main component, and containing a thermoplastic amorphous resin. U.S. Pat. No. 9,991,052 to Nakatsuka et. al. of 2018 discloses a biaxially stretched polypropylene film having a metal film deposited over at least one surface of the polypropylene film. The biaxially stretched polypropylene film for capacitors with projections on both surfaces has a thickness of 4-20 μm, and can withstand high voltages when used as a dielectric for capacitors.

4.0 SUMMARY OF THE INVENTION

For illustrative purposes, the principles of the present invention are described by referencing various exemplary embodiments. One exemplary embodiment of the present invention includes a capacitor stack, pulse coils, and electromagnetic field shields in a special geometric arrangement. The capacitor stack is comprised of a stacked array of supercapacitor capacitance elements. The capacitor stack is bracketed by pulse coils controlled by solid-state electronic circuits for generating modulated electric fields. In conformity with Jefimenko's E-field equation, the action of the electric fields on electric charge stored on the array of capacitance elements in the capacitor stack produces a unidirectional Lorentz Force, thereby generating thrust without expelling reaction mass, while reaction momentum is carried away by Poynting Vector fields in conformity with the currently understood principles of electrodynamics.

Embodiments of the present invention generate thrust in a manner distinct from the cited relevant art of Brown, Wallace, Shawyer, Woodward and numerous others in the open literature. This invention is superior to both existing high specific impulse fuel-oxidizer engines and electric ion propellant thrusters, since significant thrust levels can be produced without expelling propellant or requiring large electric power sources, and thus the need for tanks of propellant is eliminated. This invention differs from current experimental field propulsion systems in that significant thrust levels can be produced without requiring either large electric power sources or complex electromagnetic field generation control systems. Engineering analysis and component tests indicate that the present invention is scalable for general space-based applications from micro-chip thrusters up to any desired size.

This invention is capable of a full throttle range simply by either varying the amplitude of currents in the pulse coils, by varying the duration of currents in the pulse coils, by mechanically changing the inductance of the pulse coils, or any combination thereof. Further, two-axis rotation capability is used to achieve three-axis translation without the need for either gimballing systems or dedicated attitude control thrusters. Unlike spacecraft with conventional propulsion systems, the best mode of the present invention is capable of decelerating to a full stop or even reversing thrust for backward flight without the requirement of rotating the spacecraft 180 degrees. Combining these advantages with the capability of reusability without refueling, as well as long duration continuous thrusting, this invention represents a significant advance in spacecraft propulsion. In addition to space-based applications, embodiments of the present invention may also be used to generate thrust in terrestrial applications.

5.0 BRIEF DESCRIPTION OF THE DRAWINGS

The accompanying drawings, which are incorporated in and form part of the specification, illustrate various principles of operation and examples of the present invention, including a preferred embodiment of the invention, as well as alternate embodiments, and, together with the detailed description, serve to explain the principles of the invention.

6.0 SCIENTIFIC BASIS FOR THE INVENTION

Figure 1:
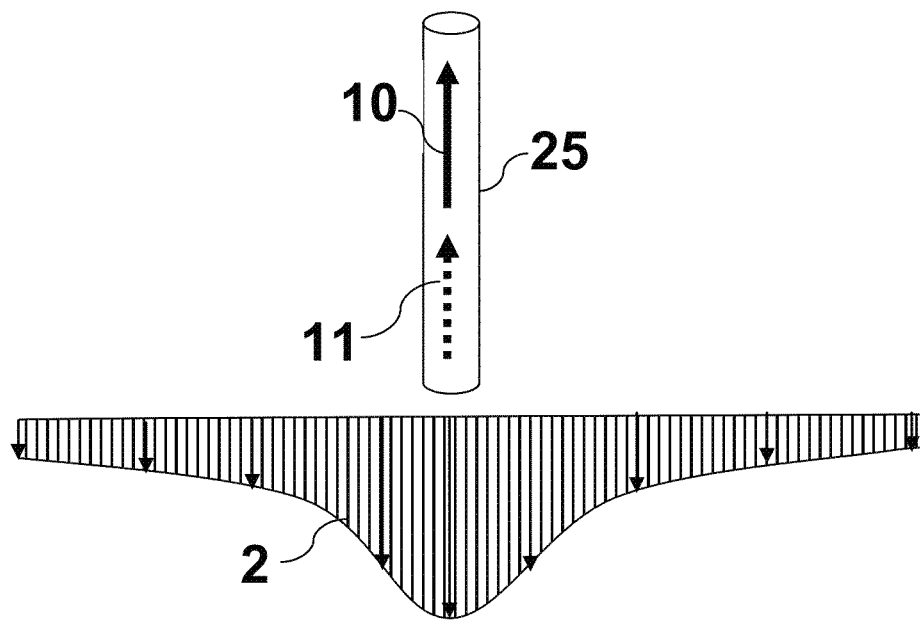
FIG. 1 is a schematic diagram illustrating the electric field radiated by modulation of a current.

The prior art devices cited above for propellantless propulsion have demonstrated the reality of propellantless propulsion. However, the reported thrust levels vary from a few micro-newtons to a few tens of milli-newtons, while requiring high power inputs on the order of kilowatts per newton or greater. Advances in solid-state electronics such as Silicon Controlled Rectifiers (SCRs) and Metal-Oxide Semiconductor Field Effect Transistors (MOSFETs) have now made it possible to switch large currents in tens of nanoseconds. U.S. Navy Pat. No. 9,530,574 cited above disclosed five centimeter diameter Super Dielectric Material (SDM) supercapacitors with an astounding tested capacity of 1 to 4 farads while operating at 0.3-0.8 volts. Technology advances such as these, when combined with the demonstrated feasibility of propellantless field propulsion, open up new avenues of research for higher thrust/lower power concepts.

Consider Jefimenko's electric field version of Maxwell's Equations, which is a "causal" integral expression of consisting of three terms defining the electric field as generated by quantities of static charge or charge density, moving charge (current), and accelerating charge (displacement current). By "causal", it is meant that the terms on the right hand side of the equation "cause" the term on the left hand side, in this case an electric field. A complete analysis for unidirectional Lorentz Force effects must include the effects of all three terms. However, by way of illustration hereinafter, the analysis of only the third term, Eq. (1), is developed. Eq. (1) defines the radiated electric field due to charged particle acceleration, as is well known to those skilled in the art and familiar with the works of Feynman and others.

$$E(r, t) = \frac{1}{4\pi\epsilon_0} \int \left[ -\frac{1}{|r-r'|c^2} \frac{\partial J(r', t_r)}{\partial t} \right] d^3r', \quad \text{(Eq. 1)}$$

This general form for the electric field at a location r due to the time derivative of the current density vector J is shown in Eq. 1, where the integral is over the volume containing J. If the volume is a circular conductor, the current density vector J flowing through the cross-section of the conductor is the usual current I, and the volume integral reduces to the line integral Eq. (2) along the length of the conductor. For modulated currents, I is time dependent, and the time derivative of I, which in the literature is the displacement current, is hereinafter denoted by Idot. Due to the free-space permeability constant, $\mu_0/4\pi$, which has a value of $10^{-7}$ newton-sec$^2$/coulomb$^2$, possibilities for using this term as the basis for a propulsion device have not been extensively explored.

$$E(r, t) = \frac{\mu_0}{4\pi} Idot \int \frac{dr'}{|r-r'|} \quad \text{(Eq. 2)}$$

Technology developments such as the solid state electronics and SDM supercapacitors mentioned above suggest revisit. Eq. (2) is basically a simple product of three terms: the free-space permeability constant, $\mu_0/4\pi$, the displacement current Idot, and a geometry factor $G_z'(l/r)$, defining the attenuation of the Idot field relative to the length of the current carrying conductor segment. By way of example, a ten amp damped harmonic current with a one microsecond decay time constant may be switched to generate an Idot on the order of $10^7$ coulombs/sec$^2$, which is just equals to the inverse of the magnitude of the free space permeability coefficient. One NaCl SDM supercapacitor, from U.S. Pat. No. 9,530,574 cited above, exhibited a measured capacitance of two farads at ½ volt, thereby storing one coulomb of charge. Locating this capacitor relative to the source of the Idot pulse described above at a distance "r" less than or equal to 0.58 times the conductor length "l", and oriented such that Idot is directed normal to the plane of the capacitor, the Idot electric field produced at the capacitor is greater than one volt per meter, resulting in a Lorentz Force F=QE on the charge "Q" of about one newton. Therefore, to first order, this "spherical chicken physics" conceptual combination of new technologies thus implies that high-thrust propellantless propulsion is possible and suggests that a little further engineering is in order.

FIG. 1 illustrates a segment of current conductor 25 having a current vector 10 with a current vector time-rate-of-change Idot 11. In accordance with the third term of Jefimenko's Equation, Idot 11 generates a radiative electric field 2. A cross section of the lateral distribution of the vector component of this electric field at a short distance below the current conductor 25 segment is shown by way of example in FIG. 1.

Figure 2:
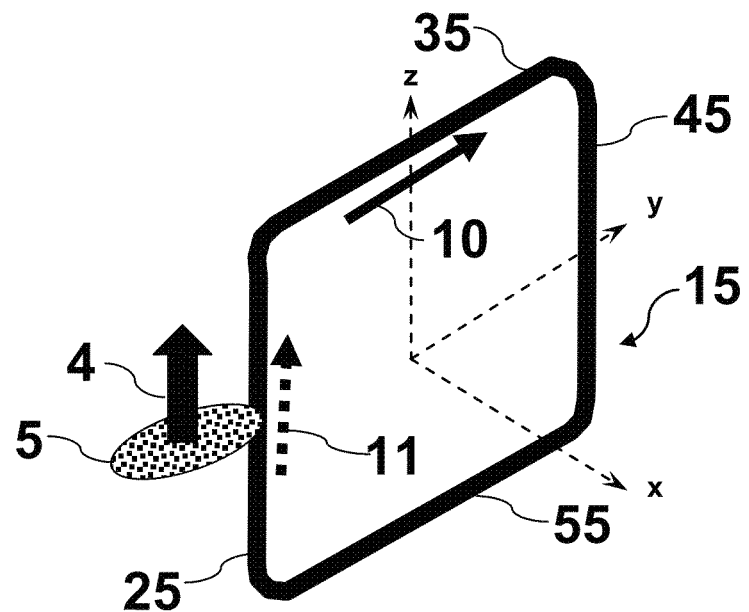
FIG. 2 is a schematic diagram illustrating the Lorentz Force reaction on a quantity of charge due to a modulated current in an electromagnetic coil.

The first term of the Lorentz Force Law defining the force vector acting on a charge due to an electric field is the well-known expression F=QE. With reference to FIG. 2, a single turn current conductor is wound in the manner of a rectangular air-core solenoid to form a conductive loop 15 comprised of four contiguous current conductor segments 25, 35, 45, and 55. Loop 15 is positioned in the y-z plane of the coordinate system shown such that a unit surface normal vector perpendicular to the plane of the loop 15 is parallel to the x-axis shown. Each current conductor segment 25, 35, 45, 55 contains a current vector 10 and current vector time-rate-of-change Idot 11. A planar charged conductive surface 5 having a net bound negative charge is positioned in the x-y plane at z=0 and at a negative y-distance from current conductor segment 25, such that lateral Idot fields from current conductor segments 35 and 55 will be equal and opposite across the surface and produce no net force.

At the instant shown, the Idot 11 vector in current conductor segment 25 induces an electric field on the bound negative charges confined to surface 5, resulting in a Lorentz Force vector component 4 acting on said bound charges in the z-direction, and thereby also causing a net perpendicular force on surface 5. There is no reaction force on loop 15 due to the charges on surface 5 because there are equal numbers of positive and negative charges comprising current conductor segment 25. Similarly, there is a lesser magnitude negative z-component Lorentz Force on surface 5 due to the Idot 11 vector in current conductor segment 45, which force is considerably smaller in magnitude than the force 4 component shown due to "1/r" attenuation. This situation is another apparent violation of Newton's Third Law. However, as has been documented (Stebens, op. cit.) and proven experimentally (White, op. cit.) in the previously cited literature, when all electromagnetic forces and momentum flux are properly accounted for on the system comprised of loop 15 and charged surface 5, there is no violation of Newton's Third Law.

Using the vector form of the Biot-Savart Law, the triple integrals for the Idot electric field induced by each segment 25, 35, 45, and 55 of loop 15 determine the net surface normal component of the Idot electric field at each point on surface 5. The average e-field distribution over the surface 5 is found by integrating the Idot electric field distribution over the surface 5, and then normalizing by the area of surface 5, resulting in a general parametric equation for the net Lorentz Force acting on the system comprising both loop 15 and surface 5:

$$F = Q_C*(\mu_0/4\pi)*Idot*G_z'$$ (Eq. 3)

Here $G_z'$ represents the non-dimensional geometric integrals for net Idot field effect on surface 5, and $Q_C$ is the charge on the surface 5. The total charge $Q_C$ is determined by the usual capacitance and voltage formula:

$$Q_C = \varepsilon_0 * \varepsilon_r * S_C * V_C / d_e$$ (Eq. 4)

A pulse coil and a current control circuit are electrically connected to form well-known LRC circuits, herein tuned so as to provide a desired modulated electric field from Idot. Subscripts "P" refer to components of the LRC pulse circuit. The solution for total charge $Q_P$ in such an LRC circuit during charging of the capacitor $C_P$ is $$Q_P(t) = C_P * V_P * [1 - \exp(-kt) * \cos(\omega t)]$$ (Eq. 5)

Differentiation of Eq. (6) results in the solution for current:

$$I(t) = -C_P * V_P * \exp(-kt) * [k * \cos(\omega t) + \omega * \sin(\omega t)]$$ (Eq. 6)

and a further differentiation produces the solution for the time derivative of current Idot:

$$Idot = dI/dt = C_P * V_P * \exp(-kt) * [(k^2 - \omega^2) * \cos(\omega t) + 2 * k * \omega * \sin(\omega t)]$$ (Eq. 7)

Here $k = R_P / 2L_P$ is the well-known damping constant of an LRC circuit, $\omega = k\sqrt{d-1}$ is the circuit frequency, and the damping parameter d is defined by $d = 4L/(R_P^2 C_P)$. The judicious choice $d=2$ which is used in the present invention reduces k to the convenient form $k = 1/(R_P C_P)$ to produce the following forms for both the current equation $$I(t) = -(V_P / R_P) * \exp(-kt) * [\cos(\omega t) + \sin(\omega t)]$$ (Eq. 8)

and the current acceleration equation $$Idot = (V_P / L_P) * \exp(-kt) * \sin(\omega t)$$ (Eq. 9)

Equation (9) illustrates that the larger the pulse circuit voltage and the smaller the circuit inductance, the larger the value of Idot. Equations (3) through (9), although limited to only the Idot effects on directed electric fields, are the theoretical basis used hereinafter for the parametric study and engineering design of the present disclosure. The objective of the present invention is to present a device which exploits a combination of these technology advances and this unique electrodynamic configuration to produce a useful device.

7.0 DETAILED DESCRIPTION OF COMPONENTS AND EMBODIMENTS

The present invention and principles of operation will now be described more fully hereinafter with reference to the accompanying drawings, in which various required components and embodiments of the invention are shown. This invention may, however, be embodied in many different forms and should not be construed as limited to the embodiments set forth herein. Rather, these embodiments are provided for illustrative purposes so that this disclosure will be thorough and complete, and will fully convey the scope of the invention to those skilled in the art. Although certain embodiments are specifically described herein, one of ordinary skill in the art will readily recognize that the same principles are applicable to and can be employed in other systems and methods. Additionally, the terminology used herein is for the purpose of description and not of limitation. Furthermore, although certain fabrication and usage methods are described with reference to steps that are presented herein in a certain order, in many instances, these steps may be performed in different order as may be appreciated by one skilled in the art; the method embodiments described are therefore not limited to the particular arrangement of steps disclosed herein. Like numbers refer to like elements throughout. Hereinafter, the term "axial" refers to a direction parallel to the general axis of symmetry of the stacked capacitance elements comprising a capacitor stack, while the terms "radial" and "lateral" refer to directions perpendicular to said general axis of symmetry of said capacitor stack.

Figure 3:
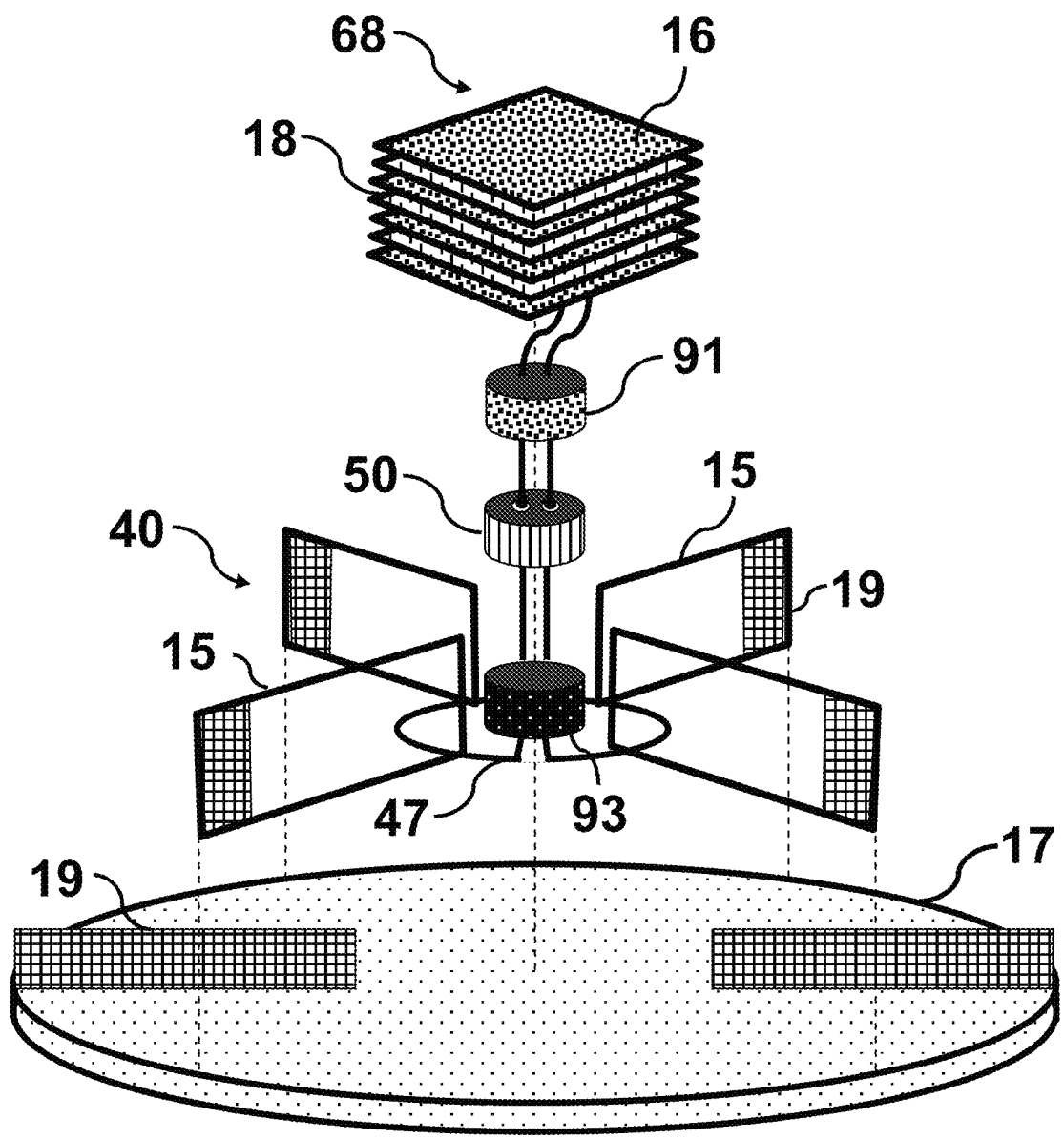
FIG. 3 is a schematic diagram illustrating the principal components of the present invention.

FIG. 3 presents an exploded perspective view of the general embodiment of the present invention, illustrating both the geometry and the major elements of the E-field propulsion system. A multiplicity of rectangular capacitance elements 16 separated by electrical insulation 18 form a capacitor stack 68. An energy supply 50, a charge control circuit 91 and a current control circuit 93 are arranged in a column in the center of a pulse coil 40. These components 68, 50, 91, 93 and 40 as well as two electromagnetic field shields 19 are attached to a support structure 17 as indicated by the vertical dashed lines.

Each capacitance element 16 in capacitor stack 68 is connected to energy supply 50 through charge control circuit 91. Circuit 91 establishes and maintains quantities of charge on each capacitance element 16 in stack 68 from the energy supply 50. Charge control circuit 91 as shown is one of two preferred options 90 and 91 which are subsequently described in detail with reference to FIGS. 5 and 6 respectively. Current control circuit 93 is subsequently described in detail with reference to FIG. 10. The energy supply 50 is a portable electricity source, such as storage batteries, fuel cells, solar panels, radioisotopic thermal generators, or small nuclear electric generator systems.

A pulse coil 40 is shown positioned co-axially below capacitor stack 68 for the function of directing modulated electric onto the stack 68. Pulse coil 40 as shown comprises four planar rectangular conductive loops 15 connected in an electrical series circuit by current conductor wiring 47 to form a sparsely-wound rectangular-cross-section toroidal air-core solenoid. Pulse coil 40 is also connected by wiring 47 to the current control circuit 93, which said circuit is connected to energy supply 50. Within the circumference of and coplanar with each loop 15 is a rectangular electromagnetic field shield 19 attached to the radially outermost vertical leg of each said loop. These attached shields 19 as well as two additional larger shields 19 attached to the support structure 17 are for the purpose of attenuating the inductance of each individual loop 15 as well as the overall inductance of pulse coil 40.

Figure 4A:
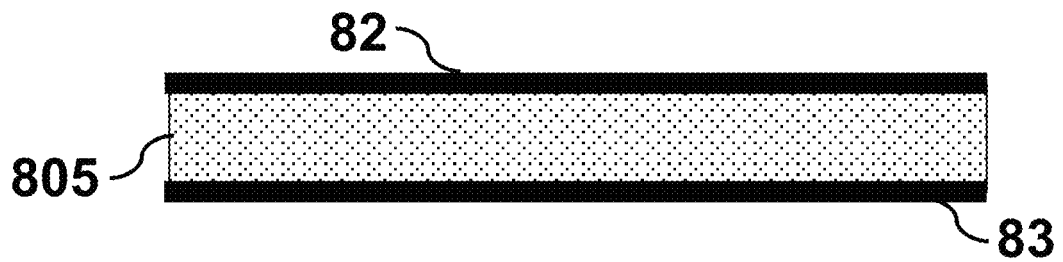
FIGS. 4A and 4B are schematic diagrams illustrating the principal components of ceramic dielectric and electrochemical double-layer capacitors.

FIG. 4A presents a cross-section of an electrostatic ceramic high dielectric material (HDM) capacitor consisting of two electrodes 82,83 separated by an HDM dielectric 805 with relative permittivity $\varepsilon_r$ on the order of $10^4$. The two highest value HDM candidates are currently $CaCu_3Ti_4O_{12}$ (CCTO) and Pb—Mg-Niobate (PMN). CCTO at room temperature has exhibited a dielectric constant as high as 18,400. $CaCu_3Ti_4O_{12}$-$0.5CuAl_2O_4$ samples with proper sintering conditions were found to also have greatly enhanced breakdown fields of more than 2 kV/mm compared to the ordinary value of 0.1 to 0.2 kV/mm in CCTO ceramics.

Lead magnesium niobate with strontium titanate and/or barium titanate composition has been found to possess extremely favorable properties such as high dielectric constant, low dielectric loss, high breakdown strength, high electrical resistivity and exceptionally high energy storage capacity. In 1994, multiple layers of Pb—Mg-niobate separated by electrodes exhibited $\varepsilon_r$ of 1200-1750 and dielectric breakdown at 65 kV/mm. Subsequently in 1999 values of $\varepsilon_r$=18,000 for pure PMN and 31,000 for PMN doped with 10% $PbTiO_3$ were reported. It is currently believed that these values are near the theoretical limits of ceramics as dielectrics.

Figure 4B:
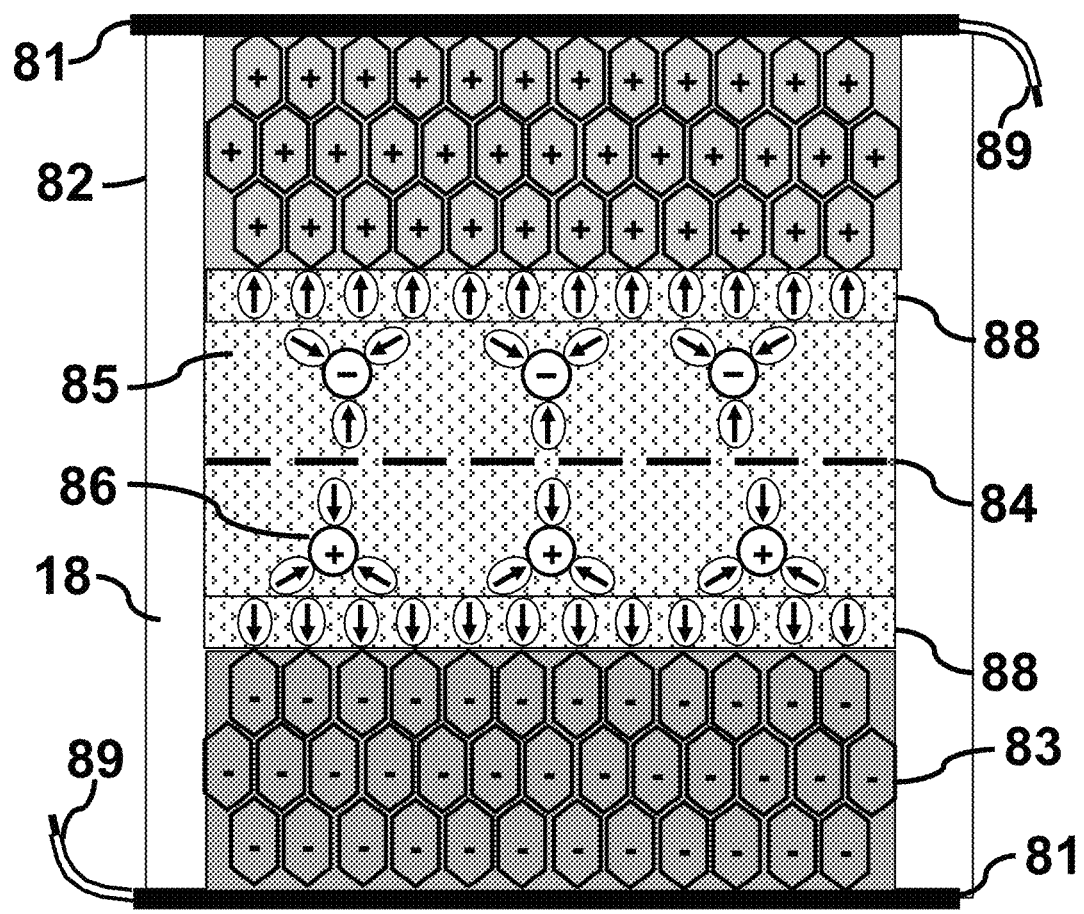

FIG. 4B presents a cross-section of an EDL supercapacitor. The basic supercapacitor components are charging wire connections 89, current collectors 81, porous carbon electrodes 82 and 83, an ion-permeable membrane 84, and an ionized electrolyte 85 contained within an electrical insulator 18. In contrast to electrostatic ceramic dielectric capacitors, electrochemical supercapacitor electrodes 82 and 83 are separated by the ion-permeable membrane 84 and electrically connected via the electrolyte 85. Energy storage occurs as charge concentration at both the current collector and the electrolyte boundaries of both electrodes 82,83, and within very thin double-layers 88 of solvated ions 86; however, these double-layers have no conventional solid dielectric to separate the charges. Generally, the energy storage of supercapacitors is at least 10 to 100 times greater than that of electrostatic HDM capacitors.

As mentioned previously above, two types of EDLC SDMs with aluminum current collectors 81 and porous carbon electrodes 82,83 were recently tested experimentally. One having an alumina/boric acid electrolyte 85 exhibited $\varepsilon_r > 10^8$, and one having alumina/NaCl electrolyte 85 exhibited $\varepsilon_r > 10^9$. The capacitance of the saline SDMs tested between 1 to 4 farads at 0.3-0.8 volts. In addition, the SDMs function at relatively low voltages, rather than the kilovolt levels required by electrostatic HDMs. Even though the charge separation distances within these EDLCs are very small, the gradient of an applied external electric field acting on the large quantities of charge produces a substantial reaction force.

Figure 5:
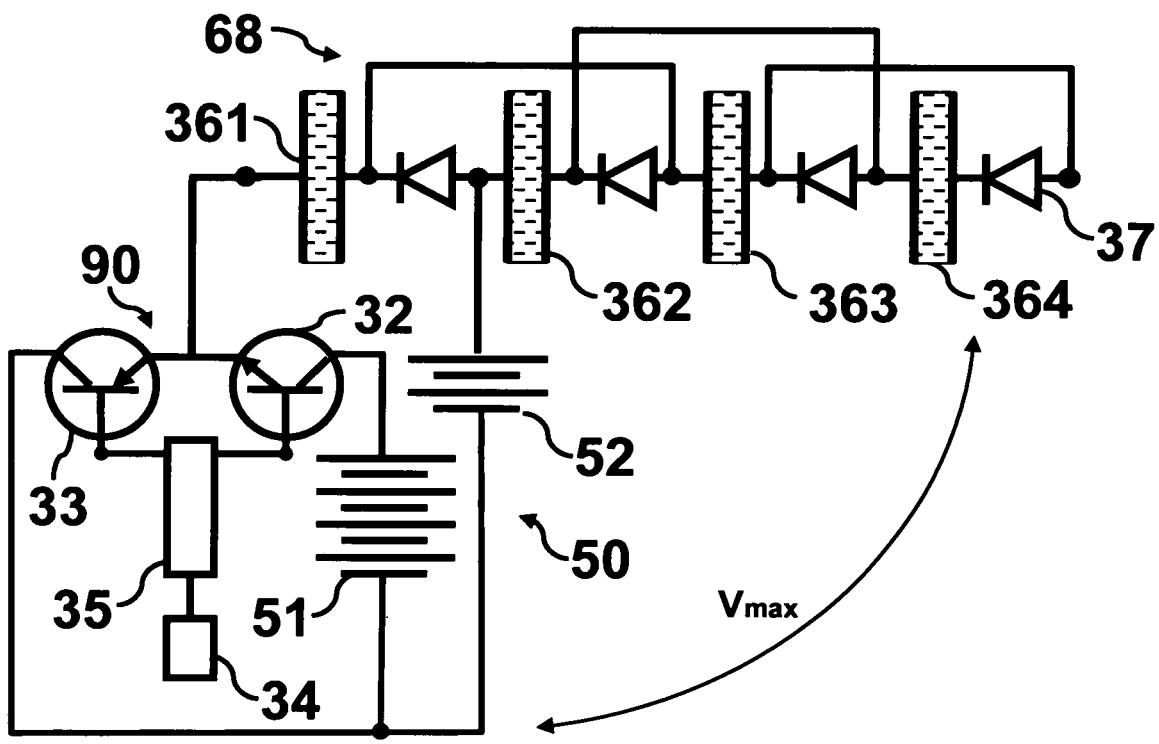
FIG. 5 is a schematic diagram illustrating the principal components of a sparsely-wound rectangular-cross-section toroidal air-core-solenoid pulse coil.

FIG. 5 presents a schematic diagram of a classic Cockroft-Walton voltage multiplier charge control circuit 90, the preferred one of many options for establishing and maintaining charge on the capacitance elements in capacitor stacks. This type of circuit is useful for simultaneous charging and continuous charge maintenance for both low-voltage and high-voltage capacitance elements. Said circuit 90 comprises a CMOS 555 retriggerable monostable 34, configured to clock a CMOS 4013 flip-flop 35 at a set pulse rate, NPN transistor 32, PNP transistor 33, and four identical diodes 37. The components of circuit 90 are powered by an energy supply 50 comprising two high-current-capacity LiPO batteries, elements 51 and 52, with the voltage of battery 51 being twice that of battery 52. The voltage of battery 51 is hereinafter termed the "step voltage". Said circuit 90 is shown electrically attached to a capacitor stack 68 comprising four identical capacitance elements, capacitors 361, 362, 363, and 364, with the four identical diodes 37 configured appropriately between the capacitors.

During a charging operation, a clock pulse from monostable 34 clocks flip-flop 35 to turn transistor 32 off and transistor 33 on, driving the left-hand side, i.e. the transistor side, of capacitor 361 to ground. Battery 52 charges the right-hand side of capacitor 361 to one-half the value of the step voltage. The next clock pulse from monostable 34 clocks flip-flop 35 to turn transistor 32 on and transistor 33 off, charging the left-hand side of capacitor 361 to the step voltage, and thereby "pushing" charge from the right-hand side of capacitor 361 to the left-hand side of capacitor 363. This process is repeated until the voltage Vmax reaches N times the step voltage, where N is the total number of capacitors in the capacitor stack. At this point, each capacitor 362, 363, and 364 has a voltage differential equal to the step voltage, while capacitor 361 has a voltage differential of one-half the step voltage, thereby producing the same charge differential on three of the four capacitors in capacitor stack 68. When capacitor stack 68 is fully charged, continuous charge maintenance is conducted by reducing the monostable 34 pulse rate.

Figure 6:
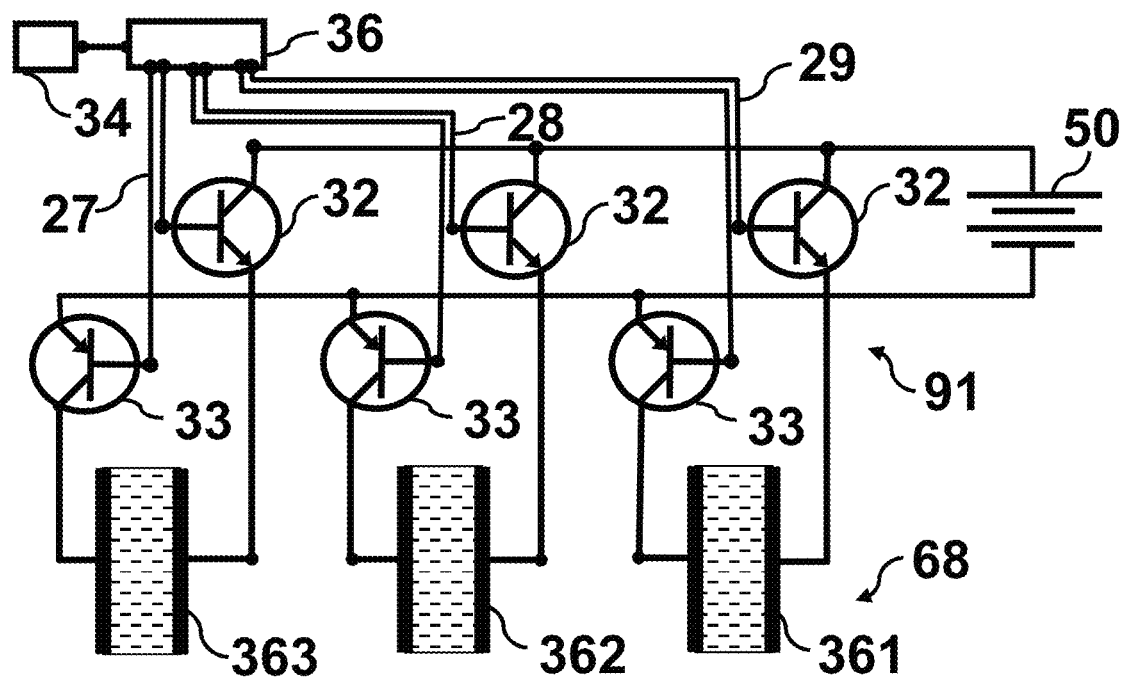
FIG. 6 is the circuit diagram of a modified Cockroft-Walton voltage multiplier charge control circuit.

FIG. 6 presents a schematic diagram of a switching transistor charge control circuit 91, another option for establishing and maintaining either low-voltage or high-voltage charge on capacitance elements in capacitor stacks 68. Said circuit 91 comprises a CMOS 555 retriggerable monostable 34, configured to sequence a CMOS 4017 counter 36 at a set pulse rate, a bank of three NPN transistors 32 and three PNP transistors 33, and three wiring pairs 27, 28, and 29. The components of circuit 91 are powered by an energy supply 50. Circuit 91 is shown electrically attached to a capacitor stack 68 comprising three identical capacitance elements, capacitors 361, 362, and 363. One side of each capacitor is connected to an NPN transistor 32 and the other side to one PNP 33 transistor.

During a charging operation, a clock pulse from monostable 34 sequences the CMOS 4017 counter 36 to turn on one NPN-PNP transistor pair, connecting energy supply 50 across one capacitor and thereby charging the capacitor. The next clock pulse from monostable 34 sequences the CMOS 4017 counter 36 to turn off the current transistor pair and to turn on the next transistor pair in sequence. This process is repeated until all capacitors 361, 362, and 363 in capacitor stack 68 are charged to the energy supply 50 voltage. When capacitor stack 68 is fully charged, continuous charge maintenance is conducted by reducing the monostable 34 pulse rate.

This circuit provides several useful variants. For high-voltage capacitance elements, the energy supply 50 can be configured with a low-voltage battery for logic circuit supply voltage and a high-voltage source such as a flyback transformer in series with a LiPO battery. For low-voltage capacitance elements, all transistors can be wired on a single control line so as to simultaneously charge the storage elements. Finally, the components of this charge control circuit 91 can be configured to successively charge the anode of a currently selected capacitor and the cathode of a previously selected capacitor. This process is repeated until the final capacitor in the charging sequence is the only capacitor having a charge differential. At this point, the three capacitors 361, 362 and 363 comprise five positively charged electrodes, and one negative electrode, thereby producing a large net positive charge on the capacitor system.

Figure 7:
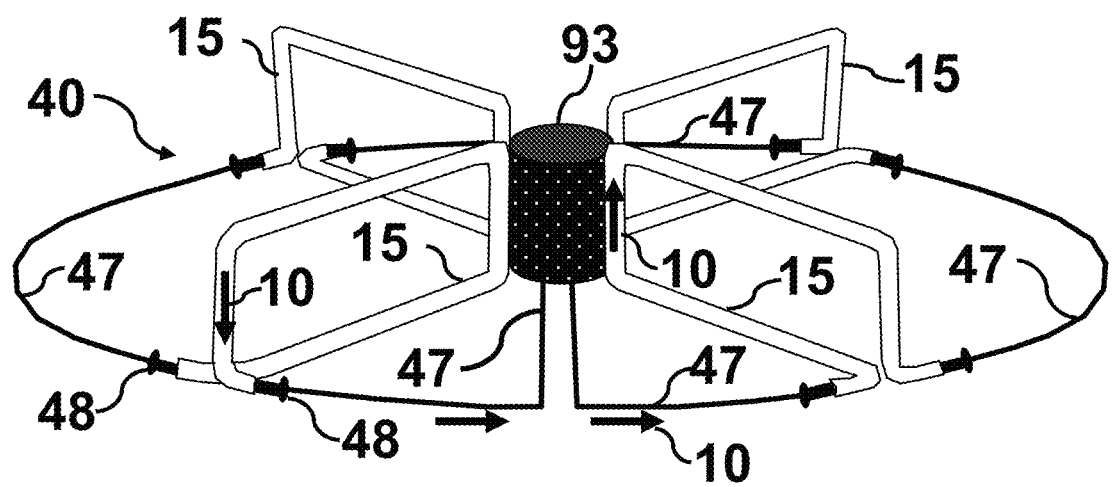
FIG. 7 is the circuit diagram for pulse-width-modulated switching transistor charge control circuit.

FIG. 7 presents a perspective view of the geometry and principle elements of a pulse coil 40, the function of which is directing modulated electric fields onto capacitor stacks. The pulse coil 40 shown comprises four planar rectangular conductive loops 15 connected in an electrical series circuit by current conductor wiring 47 to form a sparsely-wound rectangular-cross-section toroidal air-core solenoid. The wiring 47 connects each loop 15 by attachment to the wiring connectors 48 at the two open ends of each loop 15. Pulse coil 40 is also shown connected by wiring 47 to a current control circuit 93, which said circuit is further connected to an energy supply 50 not shown. The path of current flow from current control circuit 93 and subsequently through each loop 15 of coil 40 is shown by the arrows of current 10. Note that the current flow is always "up" in the radially innermost vertical segments of each loop 15, thereby directing a positive electric field onto any stack directly below, above or enclosed by coil 40.

The current conductor segments (radially "inner" and "outer" segments) of each loop 15 that are parallel to the axis of symmetry of the coil 40 produce oppositely directed electric field vectors along said axis. However, the electric field from the radially outermost segments, which segments are by design substantially farther radially from said axis of symmetry, is attenuated much more than the electric field from the inner segments due to the difference in distances from the coil center, so that the combined effect of current in these segments is a net axial electric field parallel to the axis of symmetry and having maximum intensity at the center of the coil.

The parallel segments (axially "top" and "bottom") of each loop 15 that are perpendicular to the axis of symmetry of the coil 40 cannot produce any axial electric field because the resultant electric field vectors are perpendicular to said axis of symmetry. Further, each top and bottom segment has an equal and opposite top and bottom segment positioned in direct opposition on the opposing side of the coil 40 producing oppositely directed electric fields perpendicular to the axis of symmetry. Therefore, due to geometric symmetry, there can be no net lateral electric field near the center of coil 40 produced by the collective group of top and bottom segments.

Figure 8A:
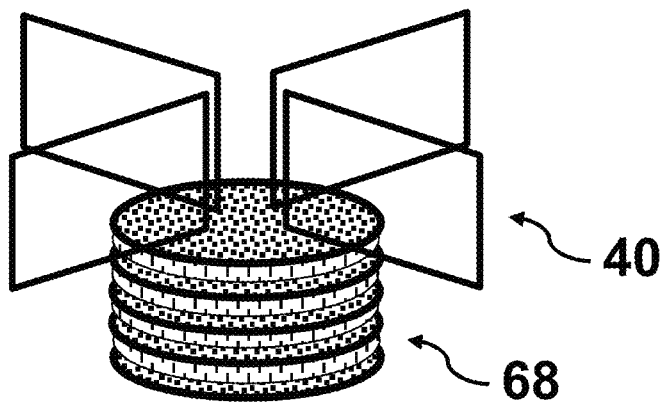
FIG. 8 is the current control circuit diagram for charging and discharging a pulse coil.
Figure 8B:
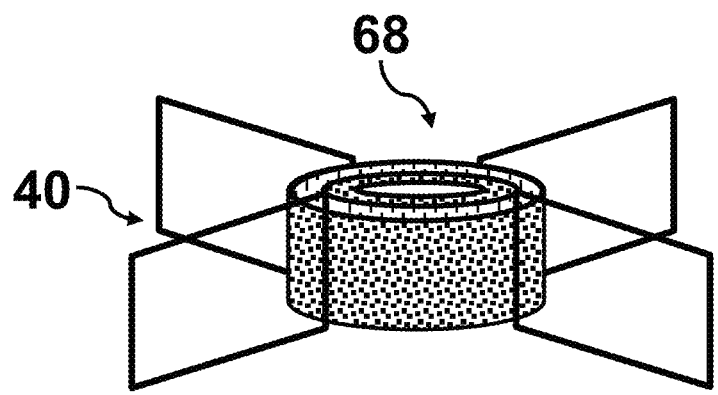
Figure 8C:
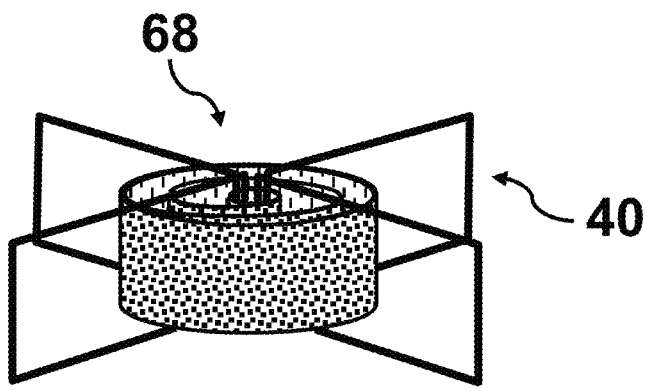

FIGS. 8A-C present perspective views of various placement geometries for positioning pulse coils 40 with respect to capacitor stacks 68. Only four-loop coils comprised of four rectangular loops are shown for clarity, and it is understood that the loops comprising the coils are electrically connected to form toroidal rectangular-cross-section air-core solenoids. FIG. 8A illustrates a pulse coil 40 configured at one end of and co-axial with a cylindrical capacitor stack 68 comprising a stack of circular disc capacitance elements. This configuration is the best mode for use with capacitor stacks wherein each capacitance element in the stack has discrete separated charges of opposite polarities. FIG. 8B illustrates a pulse coil 40 configured co-axially with and enclosing a cylindrical capacitor stack 68 comprising right circular cylinder capacitance elements. This is an alternative configuration appropriate for use with capacitor stacks wherein each capacitance element in the stack has discrete charges of opposite polarities. This configuration is also appropriate for a cylindrical capacitor stack 68 comprising a stack of flat circular disc capacitance elements wherein all but one element in the stack has a net positive or negative charge. FIG. 8C illustrates a pulse coil 40 configured co-axially with and enclosing a spiral wound cylindrical capacitor stack 68 comprising right circular cylinder capacitance elements. This configuration is also a variation appropriate for use with capacitor stacks wherein each capacitance element is a right circular cylinder capacitor. The positioning concept of FIG. 8B can also be applied to capacitor stacks comprising flat rectangular plate capacitance elements. The loops of coil 40 must then form a linear rectangular-cross-section air-core solenoid either enclosing the flat rectangular capacitor stack or positioned adjacent to and along one side of the stack.

Design and performance evaluation of the present device required precise values of the inductance of the pulse coils as a function of the number "N" of rectangular loops comprising said coils, the geometry and dimensions of individual current conductors of said loops, and other relative geometric dimensions of said coils. It was determined that classical inductance prediction formulae, for example the rectangular toroidal induction formula, did not apply in this case of a sparsely-wound, discrete rectangular loop toroid. Therefore an experimental database was developed for such discrete loop configurations.

Figure 9:
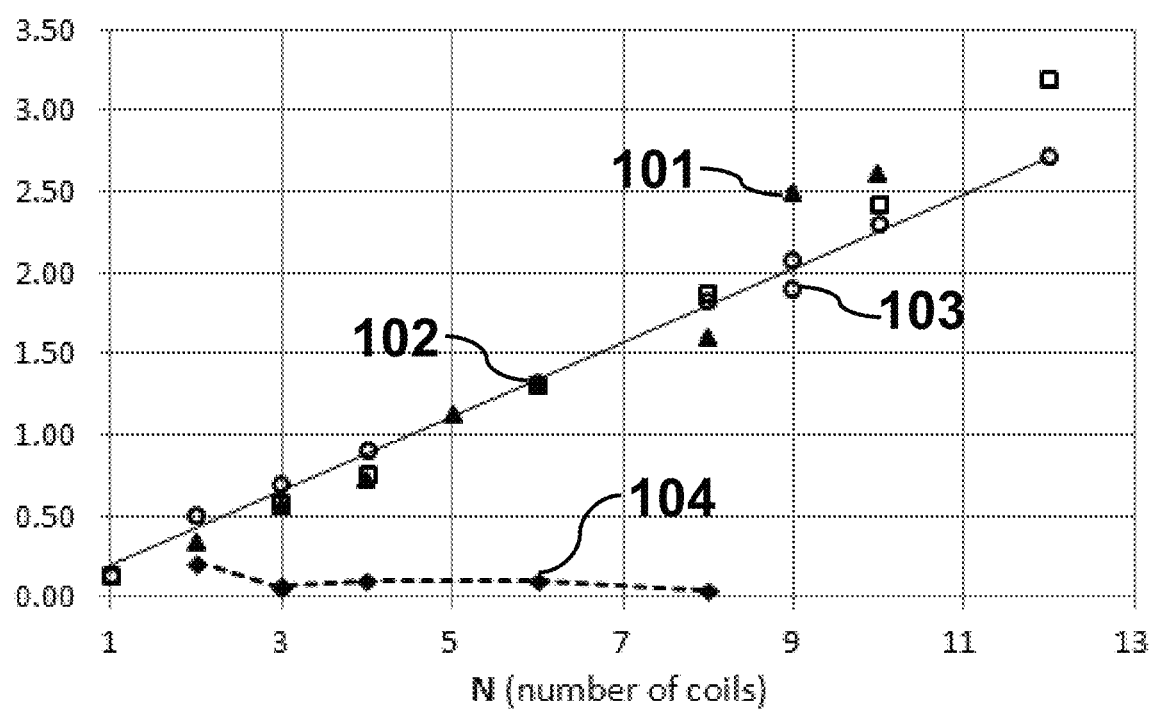
FIG. 9 is a graph of current and net force impulse versus time.

With reference to the FIG. 7 geometry of a pulse coil 40, FIG. 9 presents experimental data for toroidal sparsely-wound rectangular-cross-section air-core solenoid pulse coils as a function of the number "N" of discrete rectangular loops 15, the dimensions of each pulse coil 40, and the electrical connection method of said loops in the pulse coil as either series or parallel. Example data in FIG. 9 presents measured total inductance in micro-Henries plotted versus the number "N" of loops 15 comprising four sets of rectangular cross-section sparsely-wound toroidal pulse coils. All coils were constructed of #12 solid core insulated copper wire. All coils had the same height of 2.0 inches, and the outer radius of each coil was 3.0 inches greater than the inner radius.

For data set 101, represented by triangles, each coil had an inner radius of 0.375 inches, an outer radius of 3.375 inches, and all "N" loops electrically connected in a series circuit. For data set 102, represented by rectangles, each coil had an inner radius of 1.00 inch, an outer radius of 4.00 inches, and all "N" loops electrically connected in a series circuit. For data set 103, represented by open circles, each coil had an inner radius of 2.375 inches, an outer radius of 5.375 inches, and all "N" loops electrically connected in a series circuit. For data set 104, represented by diamonds, each coil had an inner radius of 1.00 inch, an outer radius of 4.00 inches, and all "N" loops electrically connected in parallel. The data clearly shows that for coils with nine or less loops, the inductance is a linear function of the number of loops "N". Comparison of data sets 102 and 104, which are identical configurations except for loops being connected in series for 102 and loops being connected in parallel for 104, shows that coils with loops connected in parallel have significantly lower inductance than coils with loops connected in series. Most importantly, the overall data prove that the inductance of sparsely-wound coils with discrete rectangular loops is a linear function of the number of loops "N" in each coil, rather than the non-linear "number-of-turns-squared" behavior of the classic toroid formula. Further, the classical toroid formula substantially under-predicts the inductance magnitude of such sparsely-wound toroidal coils. By way of example, for the N=9 coil in data set 102, the classic toroid formula predicts an inductance of 0.66 pH as opposed to the 2.0 µH experimental value.

Figure 10:
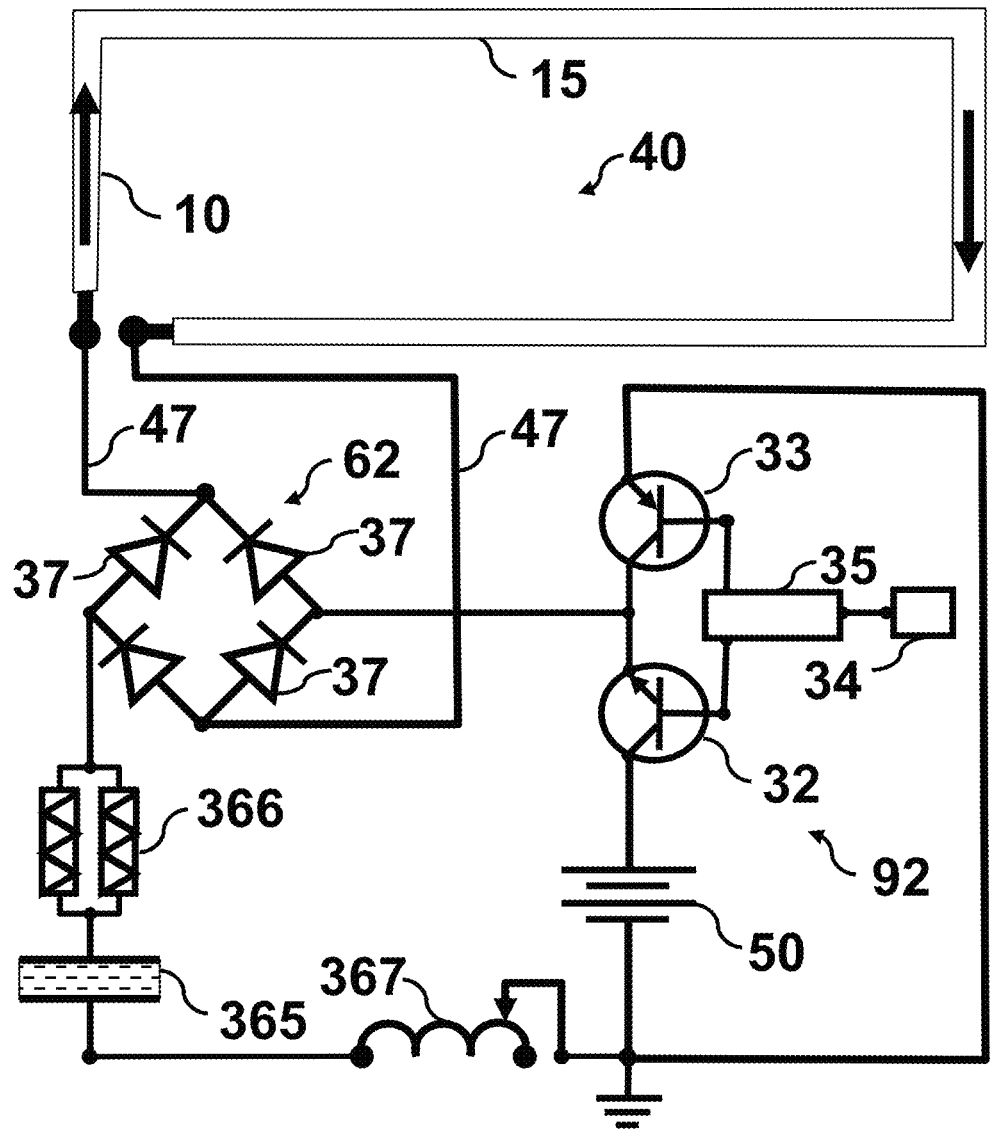
FIG. 10 is a graph of experimental inductance measurements for sparsely-wound pulse coils.

A circuit diagram of the components of current control circuit 92 of the present invention as attached in electrical series to a pulse coil 40 is illustrated in FIG. 10. Pulse coil 40 is shown comprised of only one conductive loop 15 for illustration clarity. The components of this pulse control unit 92 comprise a pulse current energy supply 50, such as a high current capacity LiPO battery, a CMOS 555 retriggerable monostable 34 configured to sequence a CMOS 4013 flip-flop 35, one polarized capacitor 365, a resistor bank 366, a tuning coil 367, one NPN transistor 32, one PNP transistor 33, and a full-bridge-rectifier 62 comprising four diodes 37. A clock pulse from monostable 34 clocks the flip-flop 36 to sequentially turn on transistor 32, thereby charging the capacitor 365 to the voltage of supply 50 by way of a clockwise current 10 through the current conductors in pulse coil 40. The monostable 34 pulse rate is tuned either to between one and ten damping time constants or to one cycle of the LRC circuit comprising coil 40, resistors 366, tuning coil 367, and capacitor 365. The next subsequent pulse from monostable 34 clocks the flip-flop 35 to sequentially turn off transistor 32 and turn on transistor 33, thereby discharging the capacitor 365 by way of a clockwise current 10 through pulse coil 40. The constant clockwise current direction is controlled by the full-bridge-rectifier 62 comprising the four diodes 37. This constant current direction during both charging and discharging cycles results in the electric current vector having the same direction within the pulse coil 40 during both charging and discharging operations, thereby always producing an electric field vector pulse in the same direction on a capacitor stack. Tuning coil 367 is used to tune the final circuit such that the ratio $4L/(R^2 \ast C)$ is as close as possible to the optimum desired value of 2.0 for optimum operation of the invention.

Figure 11:
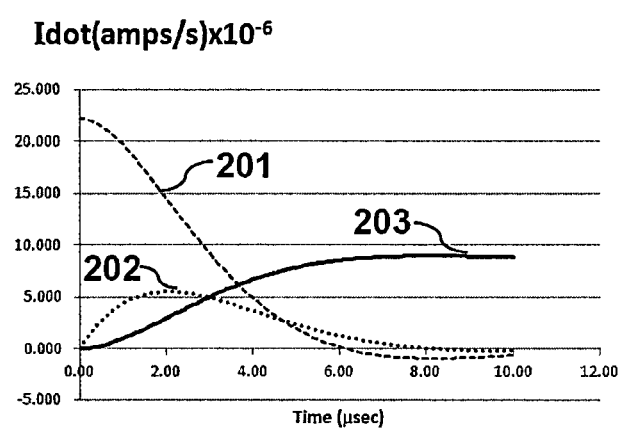
FIG. 11 is a graph of current and net force impulse versus time.

The optimized performance of currents in the pulse coils of the present invention can be calculated from Equations (2), (4), (7), and (8). With reference to the circuit shown in FIG. 10, typical results for unrectified currents, i.e. without a full-bridge-rectifier 62 in the current control circuit 92, are shown in FIG. 11. Presented are three curves illustrating the Eq. (7) current 201, the scalar value of Eq. (8) current pulse 202, and the integrated impulse 203 (force-time product) plotted versus time over one full discharge cycle of the LRC circuit comprising current control circuit 92 and a pulse coil 40. The current displays the usual damped harmonic oscillation behavior. The optimized parameters produce a current pulse 202 that is positive over almost all of the cycle. The impulse 203, which is the area under the current pulse 202 curve, is representative of the expected momentum change due to current pulse acting on the net charge on a capacitor stack.

Figure 12A:
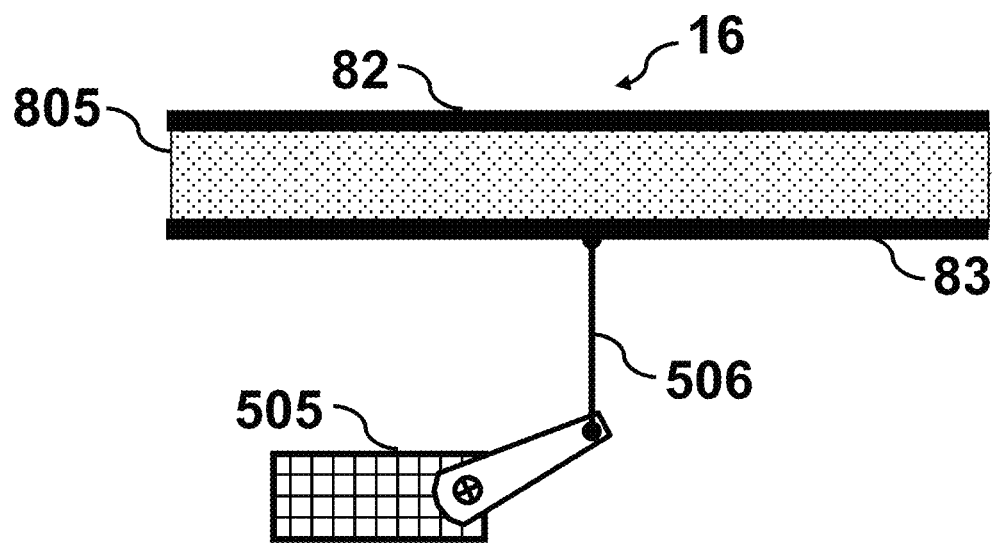
FIGS. 12A and 12B are schematic diagrams illustrating mechanical charge separation.
Figure 12B:
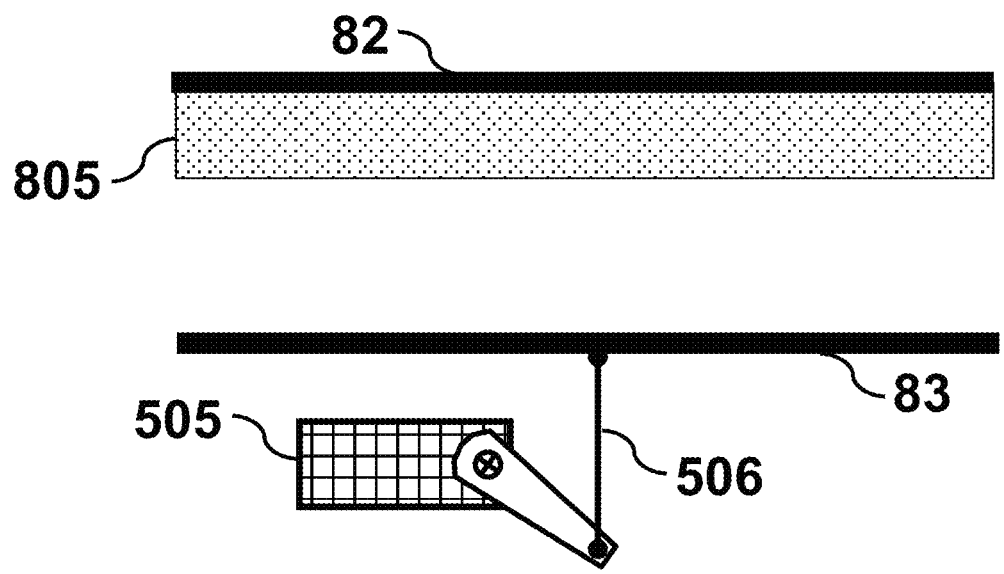

FIGS. 12A and 12B illustrate the function of a mechanical separation of electrodes by a servomotor 505 for the purpose of increasing net Lorentz Force reaction on electrodes having opposite polarity charges. FIG. 12A presents a cross-section view of a ceramic dielectric capacitance element 16 having two electrodes 82,83 separated by a dielectric 805. Electrode 83 is connected through a link 506 to a servomotor 505. Servomotor 505 compresses the two electrodes together via link 506 so that there is no gap between the electrodes and the dielectric. This is the charging configuration for element 16. Once the electrodes 82,83 are charged, servomotor 505 retracts link 506 as shown in FIG. 12B so as to displace the two electrodes along an axis normal to the surfaces of the electrodes, leaving a significant air gap between electrode 83 and the dielectric 805. Any attenuated Idot electric field directed along a normal from electrode 82 toward electrode 83 will thus produce a larger net force on the geometry of FIG. 12B than on the configuration of FIG. 12A.

An engineering design code developed to analyze and optimize the design and performance of the present invention embodiment of FIG. 3. After calibrating the design code with experimental data, the design code was then used to calculate the performance of two configurations of the embodiment of FIG. 3. The capacitor stack of the first configuration evaluated comprised a single circular 4.75" diameter low-voltage EDLC SDM supercapacitor as the only capacitance element comprising the capacitor stack. The capacitor stack 68 is encircled by a five-loop toroid of pulse coil 40. The pulse coil 40 is comprised of insulated number 12 solid conductor copper wire, with all five loops electrically connected in series to a charge-discharge current control circuit 93 as per FIG. 10. The inner radius of the pulse coil was 1.00", the outer radius was 4.00", and the height was 2.00". The dielectric for this low-voltage SDM supercapacitor was a 0.46 mm thick layer of alumina/saline paste with experimental dielectric value of $2.9 \times 10^{10}$ at 0.3V-0.8V from Table 4 of U.S. Pat. No. 9,530,574. The supercapacitor 16 was initially charged from 1.2 volt NiCad batteries in the energy supply using the charge control circuit 91 of FIG. 6. The pulse coil 40, charged and discharged from a 12V battery in the energy supply, comprised part of an LRC circuit with an effective circuit resistance of one ohm and an exponential decay time constant of two microseconds.

The capacitor stack of the second configuration comprised one to ten circular 4.75" diameter high-voltage HDM ceramic dielectric capacitance elements. The capacitor stack 68 is pulsed by a five-loop toroidal pulse coil 40. The pulse coil 40 is identical to that used for the first configuration as described above. The dielectric for this high-voltage HDM supercapacitor configuration was a 0.341 mm thick layer of lead magnesium niobate (PNM) with a dielectric constant value of $3.1 \times 10^4$ from Swartz et. al (op. cit.). The capacitance elements 16 were assumed charged from a 20 KV flyback transformer powered by a 12V battery using a charge control circuit 91 as per FIG. 6 but having the transistors replaced by MOSFETs due to the high voltage. The pulse coil 40 was charged and discharged from an energy supply 50 of 12 volts with an effective circuit resistance of one ohm and an exponential decay time constant of two microseconds.

TABLE 1

| common parameter | symbol | value | units | source |
|---|---|---|---|---|
| vacuum permeability | $\mu_0/4\pi$ | $10^{-7}$ | Nt-sec$^2$/coul$^2$ | physics tables |
| vacuum permittivity | $\varepsilon_0$ | $8.85 \ast 10^{-12}$ | coul/V-m | physics tables |
| capacitor stack radius | a | 2.375 | inches | design choice |
| number of pulse coil loops | Nw | 5 | — | design choice |
| capacitor stack plates | Ns | 1-10 | — | design choice |
| pulse coil voltage | $V_p$ | 12 | volts | design choice |
| 5 loop pulse coil inductance | $L_5$ | 1.00 | µH | experiment |
| pulse coil resistor | $R_p$ | 1.00 | Ω | design choice |
| pulse capacitor | $C_p$ | 2.00 | µF | design choice |

Table 1 summarizes a list of physics constants and elements common to both configurations. Table 2 presents a list of design parameters specific to each configuration. As described above, both configurations have the exact same geometry and operating parameters, so the results illustrate only the different effects due to dielectric characteristics, electrode separation, number of capacitive elements in the stack, and capacitor stack voltages.

TABLE 2

| design parameter | symbol | value | units | source |
|---|---|---|---|---|
| low voltage system | | | | |
| dielectric relative permittivity | $\varepsilon_r$ | $2.9 \ast 10^{10}$ | coul/V-m | U.S. Pat. No. 9,530,574 |
| capacitor dielectric thickness | de | 0.46 | mm | U.S. Pat. No. 9,530,574 |

TABLE 2-continued

| design parameter | symbol | value | units | source |
|---|---|---|---|---|
| SDM capacitor voltage high voltage system | Vc | 0.8 | volts | U.S. Pat. No. 9,530,574 |
| dielectric relative pemittivity | $\varepsilon_r$ | 3.1 * 10$^4$ | coul/ V-m | PbMgNbO3 + PbTiO3 |
| capacitor dielectric thickness | de | 0.341 | mm | estimated |
| HDM capacitor voltage | Vc | 20,000 | volts | design |

Table 3 presents comparative results from a parametric study to determine a design optimum for each capacitor type. Of note are the peak Lorentz Force values, i.e. the thrust in newtons, for each configuration, which configurations include a single capacitor, a stack of ten capacitors, a single capacitor with the anode and cathode mechanically separated by distance delta-s after charging, and, for the ceramic capacitor only, a stack of ten anodes all charged at the same voltage by a proprietary process which produces the same quantity of net charge on each electrode.

TABLE 3

| Cap. Elem. | delta-s (inches) | EDL-NaCl Thrust(N) | EDL-NaCl Watts/N | PMN ceramic Thrust(N) | PMN ceramic Watts/N |
|---|---|---|---|---|---|
| 1 | 0 | 0.0063 | 23 × 10$^3$ | 0.0054 | 27 × 10$^3$ |
| 10 | 0 | 0.0477 | 3 × 10$^3$ | 0.0489 | 3 × 10$^3$ |
| 1 | 1 | 7.138 | 20.2 | 0.2937 | 490 |
| 10(+Q) | 0 | — | — | 6.028 | 23.9 |

Surprisingly, both the low-voltage EDL configuration and the high-voltage PMN configuration have different optimum designs but with reasonably equivalent performance of 6-7 peak newtons of thrust produced by ~20 watts/newton. The optimum design for the EDL capacitor technology is a single capacitor with the anode and cathode mechanically separated by a one inch distance after charging, and for the ceramic capacitor, a stack of ten anodes all having the same quantity of net charge on each electrode.

Table 4 presents a comparison of the performance results for the optimum design of each capacitor concept from Table 3 with experimental data for related art devices. The benefits of the EDL design include requiring only a single-capacitor stack utilizing having a low capacitor operating voltage. The complexity is the use of mechanical separation of cathode and anode after charging. The benefits of the PMN design include a simple electrode/ceramic-dielectric stack with sequential charging. The complexity is the kilovolt operating voltages and required insulation of the stack. Both the EDL and the PMN optimum designs show two or more orders of magnitude improvement in total predicted thrust levels, as well as one to three orders of magnitude decrease in watts/newton, as compared to the other devices in Table 4.

TABLE 4

| Device | Thrust(N) | Power(W) | Watts/N |
|---|---|---|---|
| Biefeld-Brown (1965) | 50 × 10$^{-3}$ | 35-46 | 701-910 |
| NASA Emdrive (2014) | 91 × 10$^{-6}$ | 17 | 186 × 10$^3$ |
| Fetta-Cannae (2016) | 8-10 × 10$^{-3}$ | 10.5 | 1.05-1.31 × 10$^3$ |
| Woodward (2016) | 7 × 10$^{-6}$ | 100 | 14.3 × 10$^3$ |
| Present Device (LowV-SDM)* | 7.138 | 144 | 20.2 |
| Present Device (HighV-HDM)* | 6.028 | 144 | 23.9 |

*Engineering design-specific single plate calculations; peak predicted force only - not sustained average force.

8.0 BEST MODE

Figure 13:
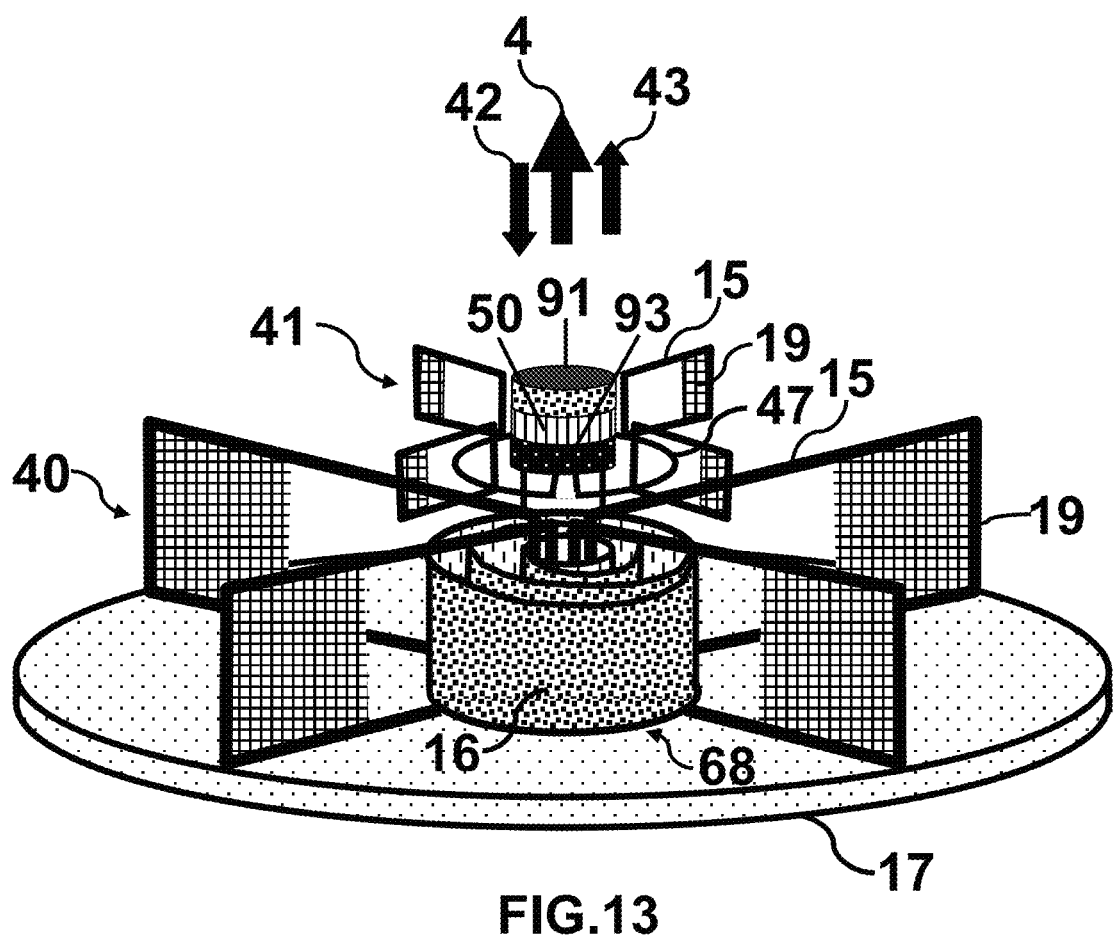
FIG. 13 is a schematic diagram illustrating the mechanics of axial thrust and planar torque production of a preferred mode of the present invention.

As a result of the parametric design study, a preferred best mode geometry of the present invention was identified and is illustrated in the perspective view of FIG. 13. The FIG. 13 embodiment comprises a cylindrical capacitor stack 68, two pulse coils 40 and 41, a charge control circuit 90, an energy supply 50, a current control circuit 93, wiring 47, electromagnetic field shielding 19, and a support structure 17.

Capacitance stack 68 comprises four capacitance elements 16 of metalized dry film deposited on polyaniline-Fe$_2$O$_3$ composite film (J. Lu et. al., op. cit.). Each element 16 is 2 inches wide, approximately 736 inches long, and 25.4 µm (0.001") thick, well within established thickness limits for such films (U.S. Pat. No. 9,991,052, Nakatsuka et. al., op. cit.). The four elements are laid out one on top the other, flat film-to-metal, and then spiral wound on a ½" hollow central core as per conventional manufacturing processes for two-electrode capacitors. The spiral winding of 187.5 complete four-ply turns of polyaniline-Fe$_2$O$_3$ composite film forms a two inch diameter by two inch high capacitor stack of with an $\varepsilon_r$ of 5500 (N. N Malikarjuna et. al., op. cit.). Experiments have shown that spiral-wound capacitors exhibit increased relative permittivity over flat stacked capacitors by a factor of two to five. An experimentally measured factor of 3.00 from a 60 inch-four-ply spiral wound coil was used in the present design study.

Pulse coil 40 is for large translational force generation while pulse coil 41 is for rotational control. Pulse coil 40 comprises five individual rectangular loops 15 to form a sparsely-wound rectangular-cross-section toroidal air-core solenoid having a measured experimental inductance of 1.0 microHenry. This preferred best mode design has pulse coil 40 enclosing stack 68 and has the inner five vertical segments of each loop 15 centered within the ½" hollow central core of the stack.

Pulse coil 41 comprises four loops 15 arranged as two geometrically opposed pairs wired in series and pulse-controlled such that either one or both pairs have reversed currents with respect to each other when the coil 41 is pulsed. The coil 41 may then be used to provide two-axis rotational control of the device as follows: with the current and current rate direction in one loop 15 reversed with respect to the other three, one loop pair produces opposing Lorentz Force components 42,43 with respect to the major translational force component 4. This illustrates the manner in which unidirectional torques as well as a translational unidirectional Lorentz Force is induced on the system, thereby providing three-axis translation and two-axis rotation without the need for gimbaled thrusters.

The energy supply 50 is a 14.7 volt LiPO battery with one output regulated to 12 volts by an LM7812 voltage regulator chip for powering the digital logic circuits of charge control circuit 90 and current control circuit 93. Pulse control is effected by current control circuit 93 as shown in FIG. 10. The pulse coils 40,41 are both charged and discharged from energy supply 50 at moderate voltages of 12 volts, each coil 40,41 having an inductance of one microHenry, an effective circuit resistance of one ohm and an exponential decay time constant of two microseconds. The pulse period is 6-10 p-sec for charging the current control circuit 93 capacitor, followed by the same period for discharging the capacitor through the full-bridge-rectifier 62 rectifier as shown in FIG. 10.

Capacitor charging of stack 68 is performed with a 20-stage version of the Cockroft-Walton voltage multiplier charge control circuit 90 as illustrated in FIG. 6. This 20-stage Cockroft-Walton voltage multiplier raises the regulated 12V output from energy supply 50 up to 240V, then establishes and maintains charge on the capacitance elements in stack 68. A proprietary process results in a net positive charge on the stack 68 as a whole. This process has been both theoretically predicted and experimentally verified.

This preferred best mode of the present invention offers several advantages compared to other propulsion systems. The design has no moving or mechanical parts, particularly for translational motion, rotational motion and thrust reversal. The system operates from a low voltage (14.7V) energy supply with a regulated 12V output for logic circuits and a moderate voltage (240V) for capacitor stack charging. The design has a compact size of ~6" diameter by ~4" high. The design uses conventional off-the-shelf components for most sub-systems, and conventional manufacturing techniques for both capacitance elements and the capacitor stack. The dry film capacitor stack has no liquid electrolyte, and therefore has no evaporation or ion degradation problems. Most importantly, engineering calculations for the FIG. 13 design as shown result in 7.72 newtons from 144 watts of power for a performance ratio of 18.65 watts/newton.

Due to obviousness considerations, certain claim elements are not presented in detail in this Specification, such as adding an additional pulse coil or using mechanical electrode separation to increase the thrust level. Likewise, the use of electromagnetic field shielding materials to experimentally "tune" the inductance of pulse coils is obvious to those skilled in the art of electromagnetics. Similarly, process details for throttling and rotating are not presented, as this is obvious to those skilled in the art of spacecraft propulsion. It is to be understood that even though numerous characteristics and advantages of the present invention have been set forth in the foregoing description, together with details of the structure and function of the invention, the disclosure is illustrative only, and changes may be made in detail, especially in matters of geometry, size and arrangement of parts within the principles of the invention to the full extent indicated by the broad general meaning of the terms in which the appended claims are expressed.

What is claimed:
1. An E-field propulsion system comprising:
   at least one capacitor stack comprising one or more capacitance elements having surface geometries of either flat parallel planes, right circular cylindrical sections, or spiroidal ribbons, said one or more capacitance elements arranged with a common axis of symmetry for storing electric charge;
   at least one pulse coil comprising current conductors for directing modulated electric fields onto the at least one capacitor stack;
   electromagnetic field shielding for both attenuating the modulated electric fields and modulating the electrical inductance of the at least one pulse coil;
   at least one energy supply for supplying electric current to the at least one pulse coil, and for supplying electric charge to the at least one capacitor stack, said at least one energy supply comprised of any combination selected from the group consisting of: storage batteries, fuel cells, solar panels, fuel-oxidizer electric generators, radioisotopic thermal generators, and nuclear electric generator systems;
   at least one pulse control circuit for the purpose of timing and modulating the electric current in at least one pulse coil; at least one charge control circuit for establishing and maintaining quantities of electric charge on the one or more capacitance elements in the at least one capacitor stack;
   wherein a net unidirectional Lorentz Force results from modulated electric fields generated by the at least one pulse coil acting on electric charges stored in the at least one capacitor stack, and further wherein electromagnetic reaction momentum is carried away by Poynting Vector fields thereby producing thrust by the E-field propulsion system without expelling propellant.

2. The pulsed E-field propulsion system according to claim 1, wherein the one or more capacitance elements are comprised of any combination of electrodes and dielectrics from the following group: a single electrode with a dielectric, a pair of electrodes each having a dielectric, an electrode-dielectric-electrode capacitor, a metalized dry film capacitor, a metalized wet film capacitor, a ceramic high-dielectric-material electrolytic capacitor, an electrostatic-double-layer supercapacitor, a faradic electrochemical pseudocapacitor, and a hybrid asymmetric electrode supercapacitor.

3. The E-field propulsion system according to claim 2, wherein materials for the electrodes comprise any combination from the following group:
   aluminum, copper, silver, gold, silicon, nickel, tin, palladium, brass, carbon, pressed graphite, carbon fiber in an epoxy matrix, multi-walled carbon nanotubes, graphene fibers, graphene sheets, and woven graphene yarn.

4. The E-field propulsion system according to claim 1, wherein any of the dielectrics comprising ceramics are comprised of one or more of the high relative electric permittivity materials from the following group:
   strontium titanate, barium strontium titanate, barium titanate, lead zircinate titanate, calcium copper titanate (CCTO), lead titanate, lead magnesium niobate (PMN), lead zirconium titanate (PZT), strontium bismuth tantalate (SBT), lead lanthanum zirconium titanate, and conjugated polymers comprised of any combination of graphene, graphite, and carbon nanotubes.

5. The E-field propulsion system according to claim 1, wherein the metalized dry thin film capacitor comprises a thin metal film bonded to a polypropylene composite film or polyaniline composite film selected from the group consisting of polypropylene titanium dioxide nano-composite, polypropylene calcium copper titanate nano-composite, polypropylene lead manganese niobate nano-composite, polyaniline titanium dioxide nano-composite, polyaniline with inorganic fillers containing titanium dioxide nanoparticles, nano-composites of polyaniline dispersed with γ-Fe2O3 nanoparticles, polyaniline/epoxy composites with different polyaniline contents developed by in situ polymerization of aniline salt protonated with camphorsulfonic acid within epoxy matrices, polyaniline-dodecyl benzenesulfonic acid-polyurethane with at least 15 wt % polyaniline.

6. The E-field propulsion system according to claim 1, wherein the current conductors in the at least one pulse coil are comprised of any combination selected from the following group:
insulated aluminum wire, insulated copper wire, insulated silver wire, insulated gold wire, insulated carbon fiber, insulated multi-walled carbon nanotubes, insulated graphene strips, insulated graphene fibers, insulated graphene yarn, and insulated graphene wire.

7. The E-field propulsion system according to claim 1, wherein the electromagnetic field shielding is comprised of one or more layers of materials selected from the following group consisting of:
iron, copper, brass, silver, gold, electrical steel, 70% Ni-16% Fe-2% Chromium alloy, 70% Ni-16% Fe-2% Molybdenum alloy, nickel-free tin-plated magnetic shielding sheet alloy, 80% Ni-20% Fe alloy, ferritic annealed stainless steel, electrical steel, 99.8% pure iron (Fe), 80% Ni-20% Fe alloy, Cobalt-iron high permeability strip material, 70% Ni-16% Fe-2% Chromium alloy, 70% Ni-16% Fe-2% Molybdenum alloy, Co—Fe—Si—B—Nb—Cu soft magnetic alloy, 99.95% pure iron (Fe) annealed in hydrogen, and iron-based alloys with magnetic field saturation limits of at least 1.4 Telsa and with 20K-35K magnetic permeability.

8. The E-field propulsion system according to claim 1, wherein the at least one pulse coil comprises at least two planar rectangular conductor loops geometrically configured so as to form either a linear sparsely-wound rectangular-cross-section air-core solenoid or a toroidal sparsely-wound rectangular-cross-section air-core solenoid, and further wherein each said planar loop of the at least two planar loops is electrically connected in either a series circuit, a parallel circuit, or a combined series/parallel circuit.

9. The E-field propulsion system according to claim 1, wherein the at least one pulse coil is geometrically positioned with a respective longitudinal toroidal axis of symmetry of said a least one pulse coil generally parallel to the common axis of symmetry so as to maximize electric field distributions directed on at least one capacitance element of said at least one capacitor stack.

10. The E-field propulsion system according to claim 1, wherein the at least one pulse control circuit is comprises a pulse-width-modulated logic circuit with a full-bridge-rectifier for the purpose of modulating currents through the said at least one pulse coil, and for the further purpose of controlling the direction of current flow in said at least one pulse coil.

11. The E-field propulsion system according to claim 1, wherein the at least one current control circuit is electrically connected to the at least one pulse coil to form an inductor-resistor-capacitor LRC circuit.

12. The E-field propulsion system according to claim 1, wherein during current flow in the at least one pulse coil, said current flow resulting from either the charging or discharging of pulse control circuit capacitors in the at least one pulse control circuit, the at least one charge control circuit either maintains constant quantities of electric charge, or reverses the polarity of quantities of electric charge, or reduces to zero quantities of electric charge in the at least one capacitor stack.

13. The E-field propulsion system according to claim 1, wherein the at least one charge control circuit comprises a Cockroft-Walton voltage multiplier circuit so as to simultaneously charge selected capacitance elements among the one or more capacitance elements.

14. The E-field propulsion system according to claim 1, wherein the at least one charge control circuit comprises a pulse-width-modulated transistor switching circuit so as to either simultaneously or sequentially charge each capacitance element of the one or more capacitance elements.

15. The E-field propulsion system according to claim 1, wherein each of the one or more capacitance elements comprises a respective capacitance element electrode, and wherein each capacitance element electrode except one are charged to the same polarity.

16. The E-field propulsion system according to claim 1, wherein the one or more capacitance elements comprises a plurality of capacitance elements, and wherein charged parts of at least two or more capacitance elements among the plurality of capacitance elements are displaced relative to each other by at least one of the following: an electric servomotor, an electromagnetic solenoid, a rack and pinion gear, a hydraulic piston, a pneumatic piston, or additional electrodes within each capacitive element among the plurality of capacitive elements.

17. The E-field propulsion system according to claim 1, wherein currents from the at least one energy supply are modulated by the at least one pulse control circuit and applied to the at least one pulse coil, thereby generating said net unidirectional Lorentz Force parallel to the common axis of symmetry.

18. The E-field propulsion system according to claim 1, wherein currents from the energy supply are modulated by the at least one current control circuit and said currents are applied differentially to at least one pair of diametrically opposed planar rectangular current conductor loops in the at least one pulse coil, thereby generating a net unidirectional torque on said E-field propulsion system perpendicular to the common axis of symmetry.

19. The E-field propulsion system according to claim 1, wherein all components comprising the at least one capacitor stack, the at least one pulse coil, the electromagnetic field shielding, the at least one current control circuit and the at least one charge control circuit are fabricated as a single device on a silicon chip.

* * * * *